(12) United States Patent
Kaur et al.

(10) Patent No.: US 12,256,305 B2
(45) Date of Patent: Mar. 18, 2025

(54) DIVERSE PATHWAY INTEGRATION

(71) Applicant: Comcast Cable Communications, LLC, Philadelphia, PA (US)

(72) Inventors: Samian Kaur, Plymouth Meeting, PA (US); Aditya Pathak, Prosper, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 4 days.

(21) Appl. No.: 17/497,825

(22) Filed: Oct. 8, 2021

(65) Prior Publication Data

US 2023/0112305 A1 Apr. 13, 2023

(51) Int. Cl.
*H04W 40/02* (2009.01)
*H04W 12/06* (2021.01)
(Continued)

(52) U.S. Cl.
CPC ........... *H04W 40/02* (2013.01); *H04W 12/06* (2013.01); *H04W 48/16* (2013.01); *H04W 60/00* (2013.01)

(58) Field of Classification Search
CPC ..... H04W 40/02; H04W 12/06; H04W 48/16; H04W 60/00; H04L 63/0815; H04L 63/0853; H04L 63/08
See application file for complete search history.

(56) References Cited

U.S. PATENT DOCUMENTS 8,098,818 B2 * 1/2012 Grilli .................. H04W 12/122 380/270
10,135,746 B2 * 11/2018 Ho ......................... H04L 45/52
(Continued)

FOREIGN PATENT DOCUMENTS

CN 106664558 B * 1/2020 ............ H04W 12/06
JP 2019153151 A * 9/2019
(Continued)

OTHER PUBLICATIONS

"3rd Generation Partnership Project; Technical Specification Group Services and System Aspects; System architecture for the 5G System (5GS); Stage 2 (Release 17)", 3GPP Ts 23.501, No. V17.2.0 Sep. 24, 2021 (2021-09-24), pp. 1-542. (Year: 2021).*
(Continued)

*Primary Examiner* — Yuwen Pan
*Assistant Examiner* — Swati Jain
(74) *Attorney, Agent, or Firm* — Ballard Spahr LLP

(57) ABSTRACT

This disclosure includes a method, alone or in combination with other methods or steps described herein. The method may include defining, based on a multipath option and an identifier, a first connection with user equipment according to a first network provider over a path of a first network that comprises packet-switched signaling. The method may include defining, based on the identifier, a second connection with the user equipment according to a second network provider over a path of a second network that comprises the packet-switched signaling. The method may include receiving first data over the path of the first network and second data over the path of the second network. The method may include sending a combination of the first data and the second data to an application server. The method may include receiving, based on the combination, a response. The method may include sending the response to the user equipment.

24 Claims, 22 Drawing Sheets

(51) Int. Cl.
*H04W 48/16* (2009.01)
*H04W 60/00* (2009.01)

(56) References Cited

U.S. PATENT DOCUMENTS

| | | | | |
|---|---|---|---|---|
| 10,516,990 | B2 | 12/2019 | Wane | |
| 11,432,357 | B2* | 8/2022 | Wang | H04L 63/0876 |
| 11,503,025 | B2* | 11/2022 | Westerling | H04L 45/74 |
| 11,564,132 | B2* | 1/2023 | Suh | H04W 76/18 |
| 11,689,966 | B2* | 6/2023 | Sahin | H04L 5/0044 370/235 |
| 11,736,224 | B2* | 8/2023 | Wang | H04L 69/14 370/329 |
| 11,758,460 | B1* | 9/2023 | Myron | H04L 47/2475 370/235 |
| 2003/0171112 | A1* | 9/2003 | Lupper | H04W 12/06 455/445 |
| 2006/0153135 | A1* | 7/2006 | Ascolese | H04W 48/18 455/436 |
| 2012/0093150 | A1* | 4/2012 | Kini | H04L 69/14 370/389 |
| 2012/0287781 | A1 | 11/2012 | Maria | |
| 2013/0065557 | A1* | 3/2013 | Zhang | H04W 12/04 455/411 |
| 2014/0141763 | A1* | 5/2014 | Suh | H04L 41/0806 455/418 |
| 2015/0138962 | A1 | 5/2015 | Tipton et al. | |
| 2015/0296415 | A1* | 10/2015 | Ling | H04L 69/08 455/552.1 |
| 2015/0312383 | A1* | 10/2015 | Roeland | H04L 69/18 370/331 |
| 2018/0278545 | A1 | 9/2018 | Andreoli-Fang | |
| 2019/0007826 | A1 | 1/2019 | Wane | |
| 2019/0058798 | A1* | 2/2019 | Lentz | H04W 4/24 |
| 2019/0098488 | A1 | 3/2019 | Syed et al. | |
| 2019/0306068 | A1* | 10/2019 | Kiss | H04W 80/06 |
| 2020/0236149 | A1 | 7/2020 | Mufti et al. | |
| 2020/0314629 | A1* | 10/2020 | Kreishan | H04W 8/183 |
| 2020/0367306 | A1* | 11/2020 | Wang | H04L 63/0884 |
| 2020/0413466 | A1 | 12/2020 | Yu | |
| 2021/0195408 | A1* | 6/2021 | Yang | H04W 48/14 |
| 2021/0234729 | A1* | 7/2021 | Cloonan | H04L 12/66 |
| 2021/0274339 | A1* | 9/2021 | Sevindik | H04W 60/00 |
| 2022/0086742 | A1* | 3/2022 | Arrobo Vidal | H04W 48/16 |
| 2022/0110177 | A1* | 4/2022 | Choksi | H04W 76/10 |
| 2022/0232366 | A1* | 7/2022 | Seo | H04W 12/35 |
| 2022/0345887 | A1* | 10/2022 | Karampatsis | H04W 12/069 |
| 2022/0417841 | A1* | 12/2022 | Chak | H04W 48/18 |
| 2023/0012793 | A1* | 1/2023 | Chak | G06F 3/0481 |
| 2023/0216852 | A1* | 7/2023 | Salkintzis | H04L 65/1069 705/44 |
| 2023/0230069 | A1* | 7/2023 | Voorhees | G06Q 20/065 705/69 |
| 2023/0232198 | A1* | 7/2023 | Salkintzis | H04W 12/72 455/411 |
| 2023/0328593 | A1* | 10/2023 | Qiao | H04W 28/0933 370/229 |

FOREIGN PATENT DOCUMENTS

| | | | | |
|---|---|---|---|---|
| WO | WO-2013166507 | A1 * | 11/2013 | G06Q 20/02 |
| WO | 2018206081 | A1 | 11/2018 | |
| WO | WO-2019010702 | A1 * | 1/2019 | H04L 45/24 |

OTHER PUBLICATIONS

Bonaventure O et al: "0-RTT TCP Convert Protocol; rfc8803.txt", 0-RTT TCP Convert Protocol; RFC8803.TXT, Internet Engineering Task Force, IETF; Standard, Internet Society (ISOC) 4, Rue Des Falaises CH-1205 Geneva, Switzerland, Jul. 29, 2020 (Jul. 29, 2020), pp. 1-28. (Year: 2020).*

"3rd Generation Partnership Project; Technical Specification Group Services and System Aspects; System architecture for the 5G System (5GS); Stage 2 (Release 17)", 3GPP TS 23.501, No. V17.2.0 Sep. 24, 2021 (Sep. 24, 2021), pp. 1-542. (Year: 2021) (Year: 2021).*

5G; Security Architecture and Procedures for 5G System (3GPP TS 33.501 version 16.8.0 Release 16), ETSI Technical Specification, European Telecommunications Standards Institute (ETSI), Sep. 27, 2021, http://www.etsi.org/deliver/etsi_ts/133500_ 133599/133501/ 16.08.00_60//ts_ 133501v160800p (Year: 2021).*

Ford, A et al. "TCP Extensions for Multipath Operation with Multiple Addresses," Internet Engineering Task Force (IETF), 2013.

ETSI TX 123 501 V15.2.0 Release 15, 3GPP TS 23.501, "Systems Architecture for the 5G System," 2018.

ETSI TX 123 502 V15.2.0 Release 15, 3GPP TS 23.502, "Procedures for the 5G System," 2018.

"3rd Generation Partnership Project; Technical Specification Group Services and System Aspects; System Architecture for the 5G System (5GS); Stage 2 (Relesae 17)," 3GPP Standard; 3GPP TS 23.501, 3rd Generation Partnership Project (3GPP), Mobile Competence Centre; vol. SA 2G2, No. V17.2.0, 2021, pp. 1-542, https://ftp.3gpp.org/Specs/archive/23_series/23.501/23501-h20.zip 23501-h20.docx.

Bonaventure et al., "O-RTT TCP Convert Protocol; rfc8803.txt," 0-RTT TCP Convert Protocol; RFC8803.txt, Internet Engineering Task Force, IETF; 2020, https://tools.ietf.org/html/rfc8803.

U.S. Appl. No. 18/081,235, filed Dec. 14, 2022, Saravanan Muthusamy (Comcast Cable Communications, LLC).

U.S. Appl. No. 18/194,912, filed Apr. 3, 2023, Samian Kaur (Comcast Cable Communications, LLC).

U.S. Appl. No. 18/298,767, filed Apr. 11, 2023, Ana Lucia Pinheiro (Comcast Cable Communications, LLC).

U.S. Appl. No. 18/193,400, filed Mar. 30, 2023, Ana Lucia Pinheiro (Comcast Cable Communications, LLC).

U.S. Appl. No. 18/093,686, filed Jan. 5, 2023, Robert Jaksa (Comcast Cable Communications, LLC).

"5G; Security Architecture and Procedures for 5G System (3GPP TS 33.501 version 16.8.0 Release 16)," ETSI Technical Specification, European Telecommunications Standards Institute (ETSI), vol. 3GPP SA, No. V16.8.0, Sep. 27, 2021, http://www.etsi.org/deliver/ etsi_ts/133500_133599/133501/16.08.00_60/ts_133501v160800p. pdf. (259 pages).

* cited by examiner

DIVERSE PATHWAY INTEGRATION

BACKGROUND

Application servers can receive information from one or more devices over networked connections. Some application servers may restrict access based on accounts, requiring communications to occur over one connection (e.g., session) with user equipment. Connection-based communications may cause conflict between the user account restrictions and efficient communication logistics. These and other communications may further challenge signaling and control associated with such networks.

SUMMARY

The present invention relates to diverse pathway integration. For a better understanding of the underlying concepts, there follows specific non-limiting examples:

This disclosure includes a method, alone or in combination with other methods or steps described herein. The method may include defining, based on a multipath option and an identifier, a first connection with user equipment according to a first network provider over a path of a first network that comprises packet-switched signaling. The method may include defining, based on the identifier, a second connection with the user equipment according to a second network provider over a path of a second network that comprises the packet-switched signaling. The method may include receiving first data over the path of the first network and second data over the path of the second network. The method may include sending a combination of the first data and the second data to an application server. The method may include receiving, based on the combination, a response. The method may include sending the response to the user equipment.

Also disclosed is a method, alone or in combination with other methods or steps described herein. The method may include receiving, based on a session request of a first network provider from user equipment, a discovery request of a network repository function. The method may include sending, based on the discovery request, a discovery response according to a second network provider. The method may include receiving, based on the discovery response, a session request for the second network provider. The method may include joining, based on the session request of the second network provider, a PDU session over a network of the first network provider and a network of the second network provider.

Also disclosed is a method, alone or in combination with other methods or steps described herein. The method may include sending, based on a session request of a first network provider from user equipment, a discovery request of a network repository function. The method may include receiving, based on the discovery request, a discovery response according to a second network provider. The method may include joining, based on a session request of the second network provider, a tunnel over a network of the first network provider and a network of the second network provider.

Also disclosed is a method, alone or in combination with other methods or steps described herein. The method may include sending, based on a registration request from user equipment over a connection over a first network of a first network provider, authentication credentials to the first network provider, the authentication credentials based on a credential circuit of the user equipment. The method may include allowing, based on the authentication credentials, access to a second network of a second provider. The method may include receiving, based on the credential circuit, first data over a path of the first network. The method may include receiving, based on the credential circuit, second data over a path of the second network. The method may include sending a combination of the data over the path of the first network and the data over the path of the second network to an application server.

Also disclosed is a method, alone or in combination with other methods or steps described herein. The method may include sending, over a first connection of a first network of a first network provider, authentication credentials, the authentication credentials based on a credential circuit of user equipment. The method may include sending, based on the credential circuit, data over a path of the first network to a proxy server. The method may include sending data over a path of a second network of a second network provider to the proxy server. The method may include receiving, based on communication between the proxy server and an application server and based on a combination of the data over the path of the first network and the data over the path of the second network, a response over the first network based on the combination and a response over the second network based on the combination.

BRIEF DESCRIPTION OF THE DRAWINGS

In order to provide understanding techniques described, the figures provide non-limiting examples in accordance with one or more implementations of the present disclosure, in which.

DETAILED DESCRIPTION

Figure 1:
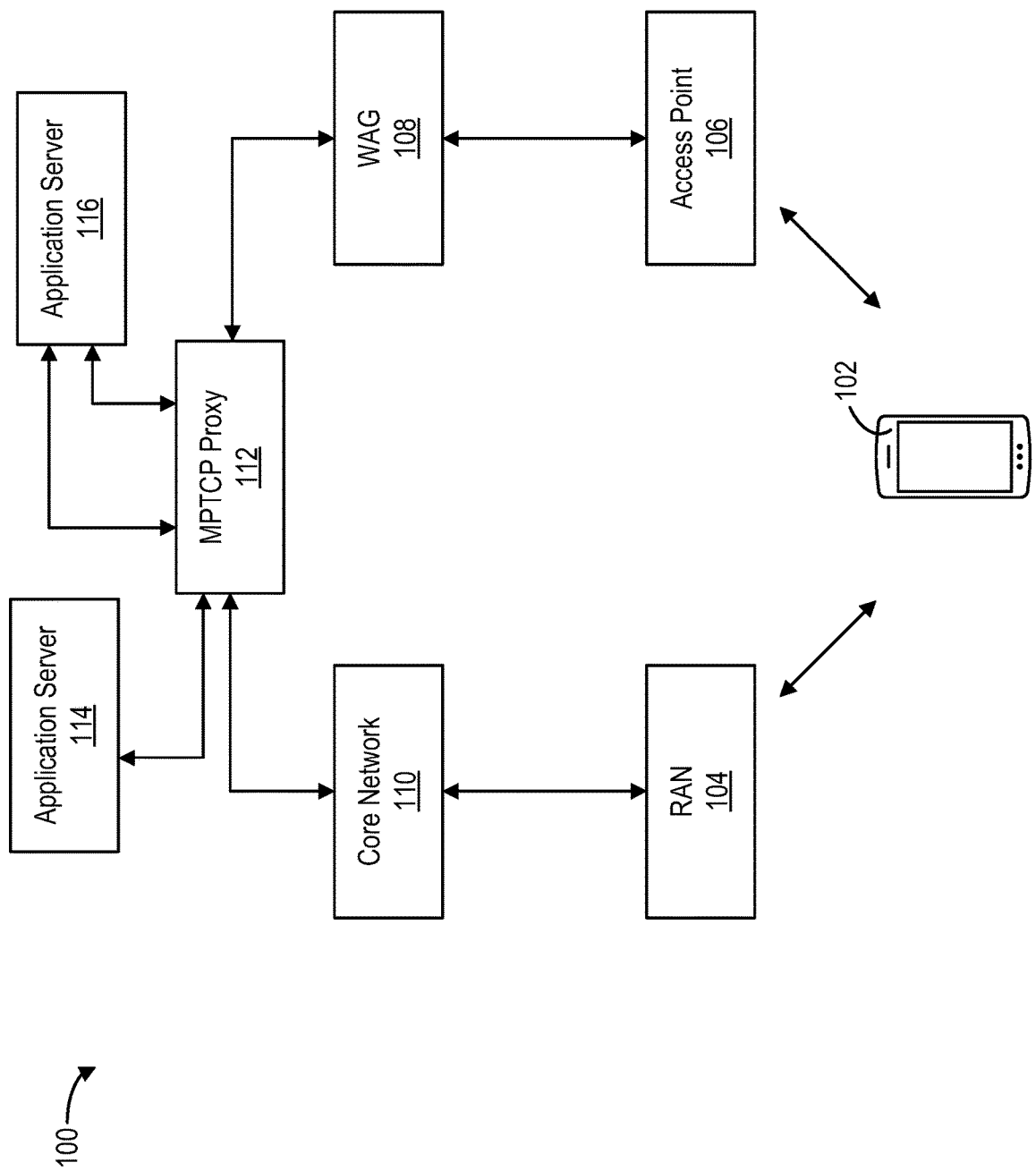
FIG. 1 illustrates an example architecture associated with a multipath connection to an application server in accordance with one or more implementations of the present disclosure.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the functions specified in the flowchart block or blocks.

These processor-executable instructions may also be stored in a computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intend to be limited to the four corners of each sheet presented.

The techniques disclosed herein may be implemented on a computing device in a way that improves the efficiency of its operation. As an example, the methods, instructions, and steps disclosed herein may improve the functioning of a computing device.

Referring to FIG. 1, an example architecture 100 associated with a multipath connection to one or more application servers 114, 116 in accordance with one or more implementations of the present disclosure. The architecture 100 defines communication paths between user equipment 102 and one of the application servers 114, 116. The user equipment 102 may be various devices configured to communicate over electromagnetic waves or other mediums. The user equipment 102 may be configured with a subscriber identity module (SIM). The SIM may be stored in persistent memory, embedded, or physical. In such a way, the SIM may form a credential circuit as data stored permanently or otherwise on the user equipment 102. The communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Communications protocols contemplated herein may be connectionless or connection-based. For example, Transmission Control Protocol (TCP) may be used to establish a state-based or connection-based communication between a client (e.g., user equipment 102), a server (e.g., application servers 114, 116), or components, hops, nodes, instances, functions there between, or combinations thereof. A protocol may define header and payload information for packets of information. Headers may define various configurations and settings associated with the transmitted payload. For instance, an option may be used to indicate a multipath protocol is being used. The multipath option may be indicative of a true state that indicates that multipath is required. Another multipath option may be indicative that multipath communication is required for communication with the user equipment 102 while the application server 114 requires a unitary path or the application server 116 can accept a multipath. As an example, the multipath option may be numerical, indicating whether the user equipment 102 requires multipath communication with a proxy 112 and whether the application servers 114, 116 require multipath communication with the proxy 112. The proxy 112 may be a multipath transmission control protocol (MPTCP) proxy. The user equipment 102, the proxy 112, the application servers 114, 116, or combinations thereof may specify the multipath option. For instance, the multipath option may be bartered for by the one or more of the user equipment 102, the proxy 112, or the application servers 114, 116.

As such, a communication path may be established between user equipment 102 and one or more of the application servers 114, 116, through the proxy 112 over a network having a 3GPP or cellular access point. A communication path may be defined by the individual hops made alone the path between components, instances, functions, servers, and interfaces. A path may be unique in that the set of hops are unique. For example, a path comprising hopes between A, B, and C may be considered unique from a path that consists of A and B or a path that comprises A, B, and D. A network may be defined as a set of components, instances, functions, servers, interfaces, other implements and combinations thereof that are configured to communicate or have access to communicate with one another. The network may consist of those components, instances, functions, servers, interfaces, other implements and combinations that are managed by a network provider (e.g., network providers 210, 230) and configured to communicate. A network may be a logical grouping of the set (e.g., subnet). A network may be virtually grouped logically (e.g., virtual private network) or contain portions that are virtually grouped logically.

A 3GPP network may include wireless communication protocols between user equipment 102 and the 3GPP base station 104 (e.g., eNB, gNB, xNB), which may be part of a radio access network based on various radio access technologies. The radio access network may be associated with a network provider. A network provider (e.g., public land mobile network (PLMN)) may maintain the radio access network and the associated core network 110. The network provider may issue subscriptions for the user equipment 102 or the application servers 114, 116 to access the network. The network may include communications hardware and software to support various protocols and components (e.g., 3GPP, 802.11).

Another communication path may be established between user equipment 102 and one or more of the application servers 114, 116, through the proxy 112 over a network having a WiFi or IEEE 802.11 access point 106. The access point 106 may be configured to communicate with a wireless access gateway 108. The wireless access gateway 108 may route data packets from the access point 106 to the proxy 112. A network provider may maintain the access point 106 and the associated wireless access gateway 108. The network provider may issue subscriptions for the user equipment 102 or the application servers 114, 116 to access the network. The subscriptions may be issued in packages (e.g., subscription packages) and stored or unpacked on a SIM or embedded SIM. The network provider associated with the access point 106 may be different than the network provider associated with the radio access network.

Figure 2:
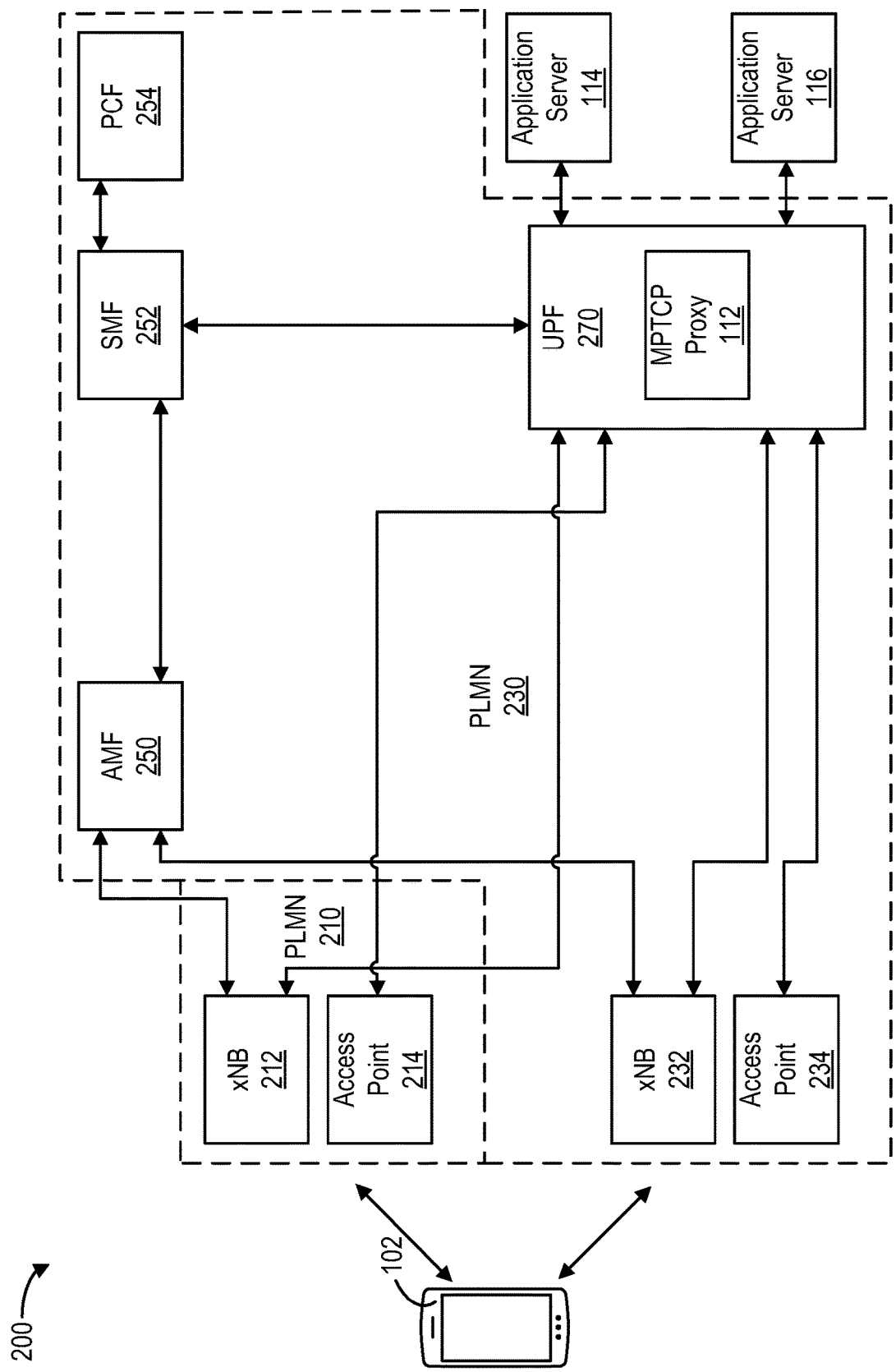
FIG. 2 illustrates an example architecture with an inter-PLMN control plane in accordance with one or more implementations of the present disclosure.

In FIG. 2, an example architecture 200 with an inter-PLMN control plane in accordance with one or more implementations of the present disclosure is shown. The architecture 200 includes a shared control plane that comprises an access and mobility management function 250 (AMF) and a session management function 252 (SMF). The control plane may include a policy control function 254 (PMF). Although described as 5G 3GPP components and functions, the functions may also correspond to other mobile network generation functions and components (e.g., long-term evolution (LTE)). As an example, as nomenclatures evolve, the functions described herein may be related or performed through different functions, instances, containers, or otherwise in later revisions of standards. For instance, the access and mobility management function 250 may be part of a different function for a different standard.

The access and mobility management function 250 is the entry function of the control plane and may connect to the core network. The access and mobility management function 250 may terminate the non-access stratum (NAS) of the user equipment 102. The access and mobility management function 250 may also perform access authentication for the user equipment 102 and mobility management. Additionally, the access and mobility management function 250 may route session management messages to the one or more session management functions 252.

The session management function 252 may be responsible for termination of session based on the session management function from the user equipment 102. The session management function 252 may allocate Internet Protocol addresses and provide control of the user plane function 270 (UPF). The session management function 252 may also terminate sessions associated with the policy control function (PCF). The session management function 252 may communicate with the access and mobility management function 250 over the N11 interface and the policy control function 254 over the N7 interface.

The policy control function 254 may enable policy rules described herein and enable control functions for enforcement. These rules may be distributed and enforced at the user equipment 102 or other functions described herein. As an example, the policy control function 254 may enable route and slice selection.

The user plane function 270 may implement the packet forwarding and routing for user plane data in the role of the inter-radio access technology (RAT) and intra-RAT anchor. The user plane function 270 may also provide IP address allocation when instructed by the session management function 252 and can provide gating or downlink data buffering. The user plane function 270 may communicate with the session management function 252 over the N4 interface. The user plane function 270 may communicate with the data network associated with the application servers 114, 116 over an N6 interface. The application servers 114, 116 may be part of either network provider 210, 230 or available on the Internet or other data networks not associated with the network providers 210, 230.

The proxy 112 may serve as a proxy between the user equipment 102 and the application servers 114, 116. The proxy 112 may be partially or fully implemented as described in RFC 8684 by the IETF. The proxy 112 may use other protocols that are configured to provide a single session from a multipath connection.

As shown, each network provider 210, 230 has a respective radio access network 212, 232, including base stations (e.g., xNB), or provided radio access network along with respective access points 214, 234, which may be configured to provide IEEE 802.11 access to the proxy 112. As shown, the radio access networks 212, 232 and access points 214, 234 may communicate with the access and mobility management function 250 of one network provider to obtain access to both networks over an N2 interface. The user equipment 102 may communicate through the access points the radio access networks 212, 232 and access points 214, 234 with the user plane function 270 over the N3 interface to the proxy 112.

Figure 3:
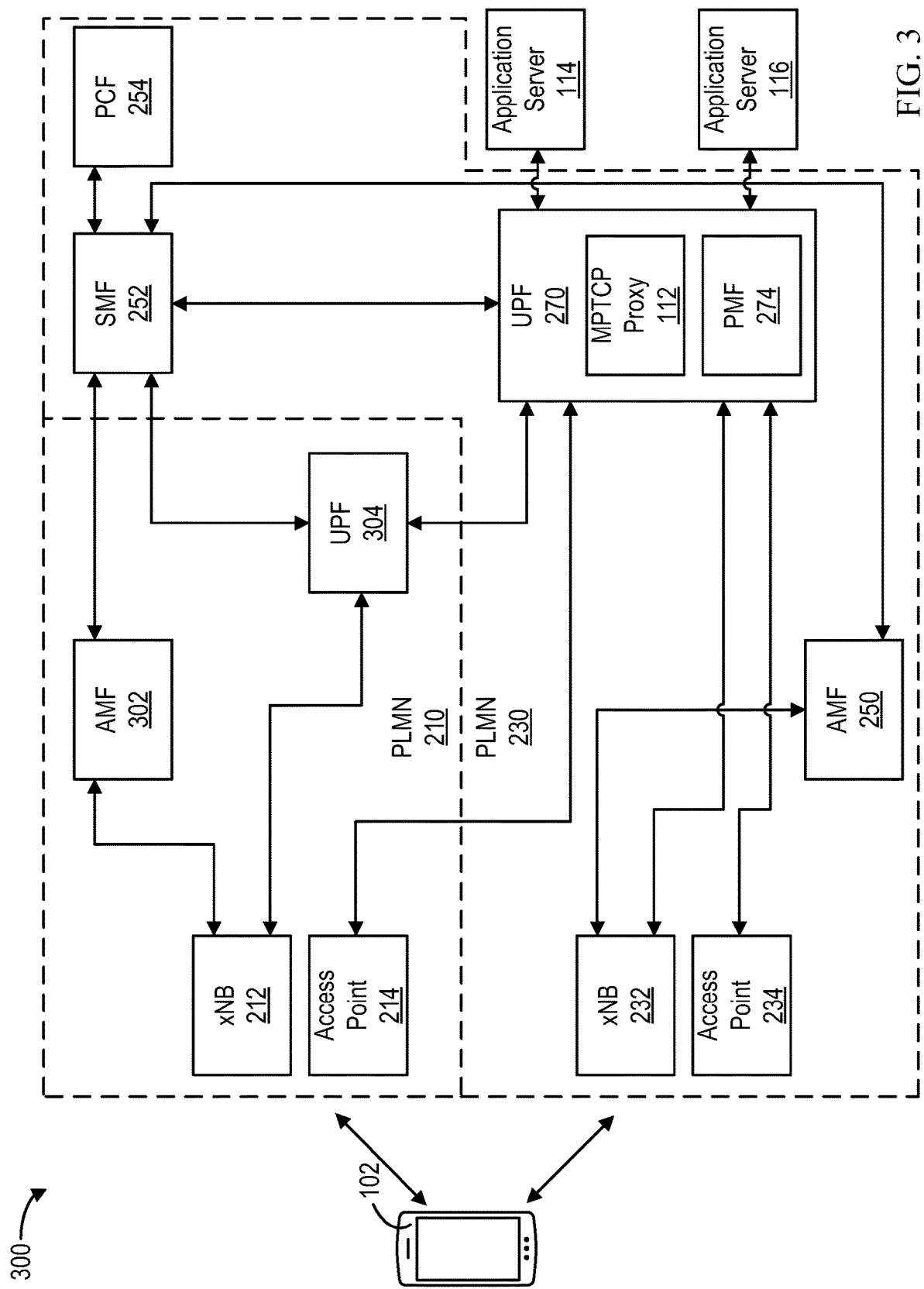
FIG. 3 illustrates an example architecture with user plane functions associated with each network provider in accordance with one or more implementations of the present disclosure.

In FIG. 3, an example architecture with user plane functions associated with each network provider in accordance with one or more implementations of the present disclosure is shown. Each of the network providers 210, 230 have respective user plane functions 270, 304 and access and mobility management functions 250, 302. The user plane functions 270, 304 receive instructions over the N4 interface from the session management function 252. The access and mobility management functions 250, 302 receive session information over the N11 interfaces. As such, network providers 210, 230 can share session management function 252 while providing multipath connection to the user equipment 102 and the application servers 114, 116.

Figure 4:
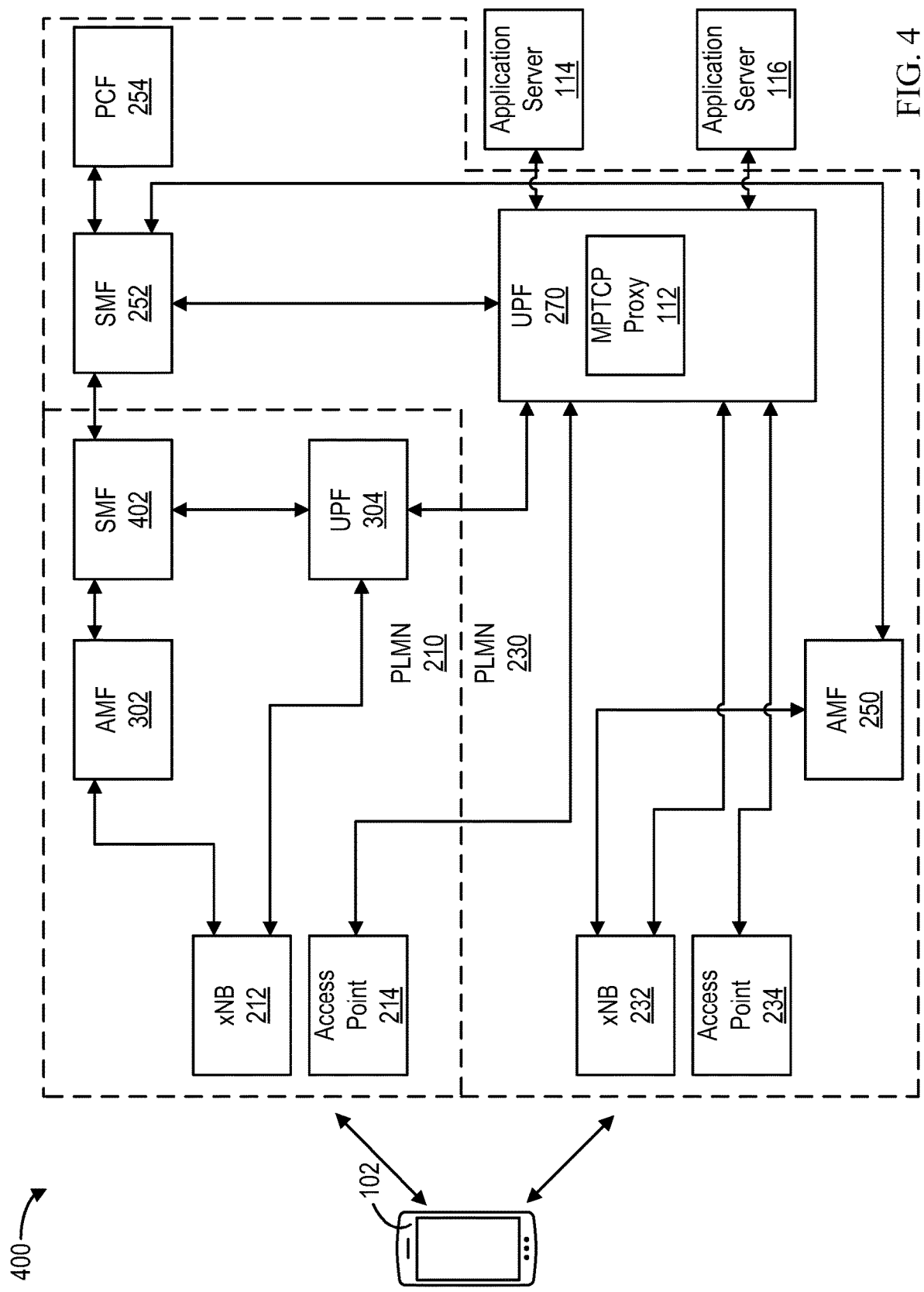
FIG. 4 illustrates an example architecture with a network-specific session management function in accordance with one or more implementations of the present disclosure.

In FIG. 4, an example architecture 400 with a network-specific session management function in accordance with one or more implementations of the present disclosure is shown. As in FIG. 3, each of the network providers 210, 230 have respective user plane functions 270, 304 and access and mobility management functions 250, 302. Each of the user plane functions 270, 304 are associated with respective session management functions 252, 402. Session management functions 252, 402 exchange information regarding the multipath connection over an N16 interface and the user plane functions 270, 304 communicate over an N9 interface.

Figure 5:
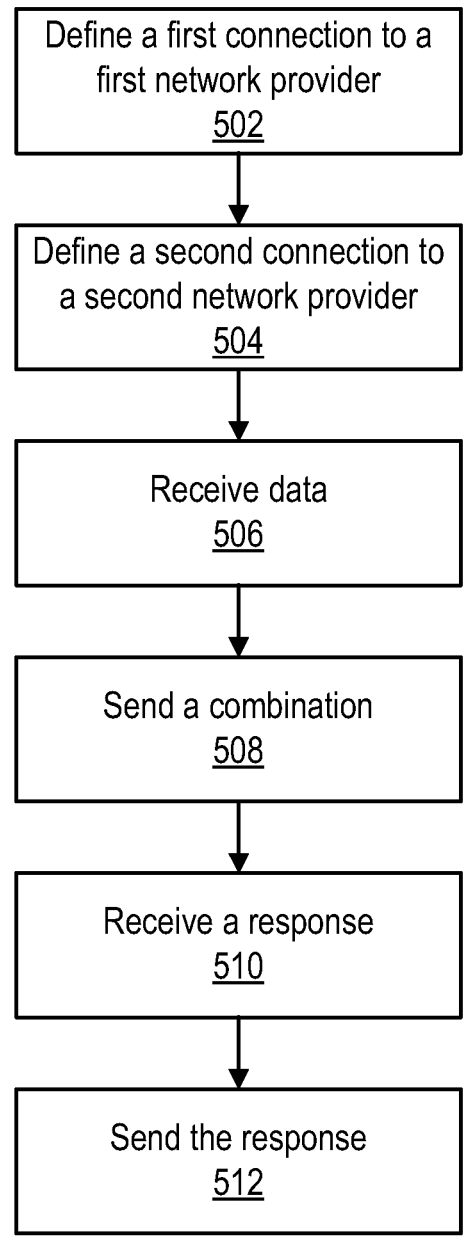
FIG. 5 illustrates an example method in accordance with one or more implementations of the present disclosure.

In FIG. 5, an example method 500 in accordance with one or more implementations of the present disclosure is shown. In step 502, the method 500 may include defining a first connection with user equipment. The connection may be generated, joined, or established. For example, a connection may be based on a sequence number, syn, syn/ack, ack, cadence, or other features that distinguish from a connectionless connection (e.g., UDP). The first connection may be based on a multipath option and an identifier. The multipath option may indicate that the date is sent according to a multipath protocol (e.g., MPTCP protocol). The multipath option may indicate how data should be transmitted between the user equipment 102, the application servers 114, 116, or combinations thereof. The identifier may be unique for recognition of the multipath session with respect to other multipath sessions. The first connection may be according to a first network provider. The first connection may be over a path of a first network that comprises packet-switched signaling. As an example, the first connection may be over a path that includes a 3GPP base station.

In step 504, the method 500 may include defining a second connection with the user equipment. The connection may be joined, established, or generated as described herein. The second connection may have the same identifier as the first connection to indicate a multipath connection. The second connection may be according to a second network provider. The second connection may traverse over a path of a second network that comprises packet-switched signaling. As an example, the second connection may be over a path that includes an access point based on IEEE 802.11.

In step 506, the method 500 may include receiving data over the path of the first network and data over the path of the second network. As an example, the data may be stored in a buffer and received over both the path of the first network and the path of the second network. In step 508, a combination of the data may be sent. The path may be over the path of the first network and the path of the second network. It should be appreciated that paths may not have mutually exclusive nodes. As an example, one path from the user equipment 102 may traverse the radio access network, the core network, the proxy 112, and one or more of the application servers 114, 116. The destination may be based on the multipath option or a list stored on the proxy 112. As an example, the user equipment 102, proxy 112, one or more of the application servers 114, 116, or combinations thereof, may define that only one session to the application server (e.g., application server 114) may be used. As such, the proxy 112 may combine the data received over both paths and send it to the application server 114 over one session. As another, the user equipment 102, proxy 112, one or more of the application servers 114, 116, or combinations thereof, may define that more than one session to the application server (e.g., application server 116) may be used. The multipath option in a header may be used to specify the number of sessions. A list may be used to specify the number of sessions.

In step 510, a response from one or more of the application servers 114, 116 may be received. The response may be based on the combination over one more sessions specified by the list or the multipath option. In step 512, the response may be sent to the user equipment 102. In such a way, regardless of the number of sessions required by the user equipment 102 or one or more of the application servers 114, 116 can be fulfilled without a loss of connection or compatibility.

The data may be assembled based on a data sequence mapping. The data sequence map may be based on a first subflow sequence number and a second subflow sequence number associated with each path, respectively. As such, the combination of the data from the path of the first network and the data of the path of the second network may be combined based on the data sequence mapping to establish ordered data without a loss of integrity. The response may be disassembled into portions and retransmitted over the respective paths to improve throughput and speed in a similar fashion. The network between the application servers 114, 116 and the proxy 112 may be the Internet or another network. It should be appreciated that the combination sent to one or more of the application servers 114, 116 may be based on a quantity of sessions defined or based on the application servers 114, 116. The first network provider may be identified with a first identification number and the second network provider may be identified with a second identification number. The identification numbers may be unique. One or more of the network providers may be a mobile virtual network operator.

Figure 6:
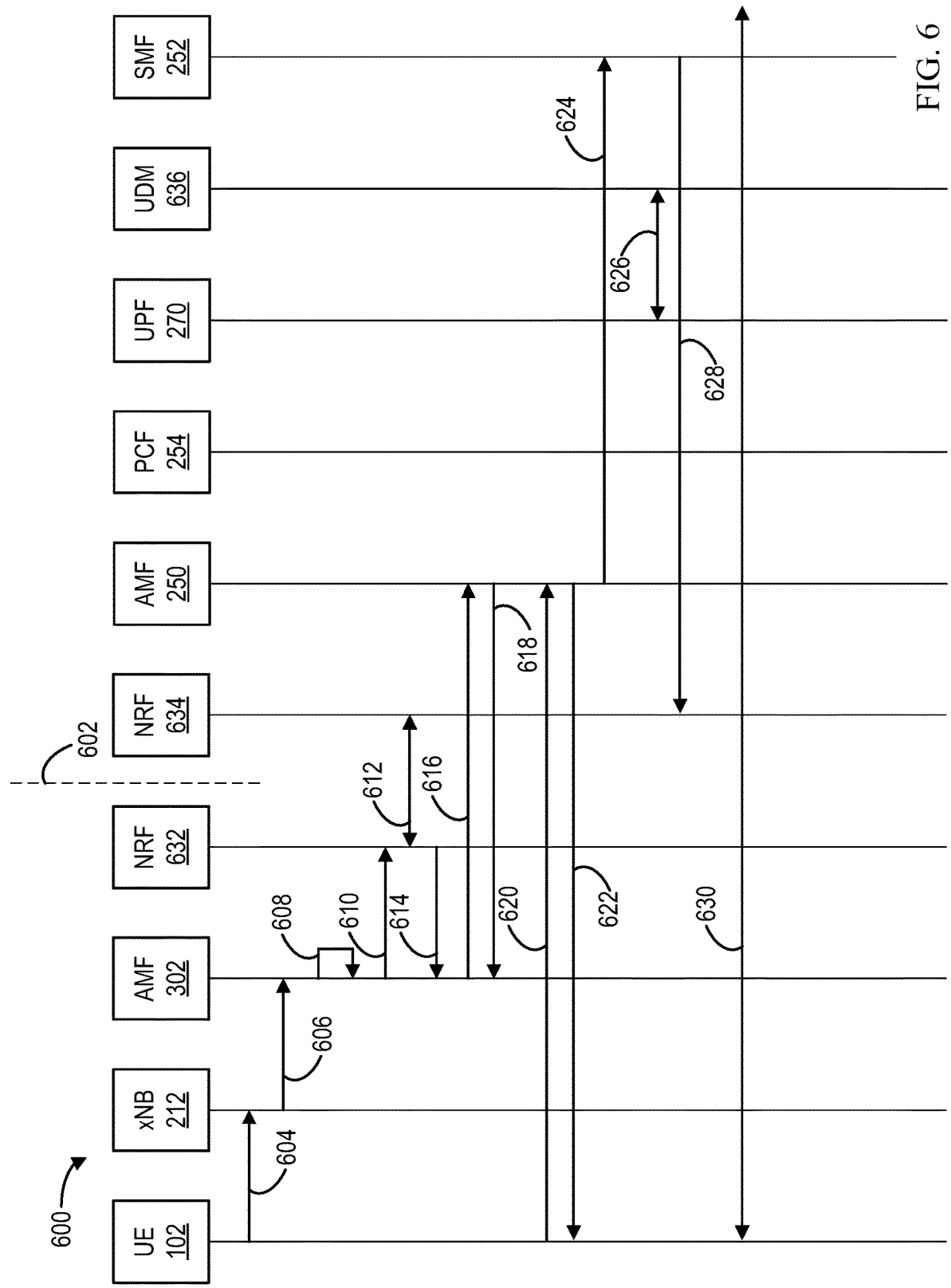
FIG. 6 illustrates an example call flow associated with establishing a session based on an access and mobility management function in accordance with one or more implementations of the present disclosure.

Referring to FIG. 6, an example call flow 600 associated with establishing a session based on an access and mobility management function (e.g., access and mobility management function 250, 302) in accordance with one or more implementations of the present disclosure is shown. The call flow 600 includes calls between entities of the network providers (e.g., network provider 210, 230). The network providers 210, 230 have a variety of functions that are organized by divider 602. In step 604 the user equipment 102 sends a session request to the network provider 210 through the radio access network to the access and mobility management function 302 of a network provider (e.g., one of the network providers 210, 230) in step 606. The access and mobility management function of a network provider (e.g., one of the network providers 210, 230) may recognize a non-native globally unique temporary identifier (GUTI) and access traffic steering, switching, and splitting (ATSSS). Based on determining that the user equipment 102 is configured for ATSSS in step 608, the access and mobility management function 302 of a network provider (e.g., one of network providers 210, 230) may send messages to determine whether other networks (e.g., network provider 230) are available for establishing a connection.

As an example, in step 610 the access and mobility management function of a network provider (e.g., one of the network providers 210, 230) sends a discovery request to the network repository function 632 or network function repository function (NRF) of a network provider (e.g., one of the network providers 210, 230), initiating a discovery request between the network repository function 632 of a network provider (e.g., one of the network providers 210, 230) and the network repository function 634 of a network provider (e.g., one of the network providers 210, 230) in step 612. The request may include generation of any network functions needed to perform ATSSS. A discovery response may be sent from the network repository function 634 of a network provider (e.g., one of the network providers 210, 230) to the network repository function 632 of a network provider (e.g., one of the network providers 210, 230). In step 614, the network repository function 632 of a network provider (e.g., one of the network providers 210, 230) may send the discovery response to the access and mobility management function 302 of a network provider (e.g., one of the network providers 210, 230).

In step 616, a context transfer associated with the user equipment 102 may be performed to establish the user equipment 102 on the second network provider 230. The context transfer may include the GUTI. In step 618, a notification of the context transfer being successful may be sent to the source access and mobility management function 302 of a network provider (e.g., one of the network providers 210, 230) from the target access and mobility management function 250 of the other network provider (e.g., one of the network providers 210, 230).

In step 620, the access and mobility management function 250 of a network provider (e.g., one of the network providers 210, 230) may request the identity of the user equipment 102. The user equipment 102 may provide the access and mobility management function 250 of a network provider (e.g., one of the network providers 210, 230) its identity in step 622, enabling the user equipment 102 to exchange authentication and security credentials with the authentication server function. The access and mobility management function 250 of a network provider (e.g., one of the network providers 210, 230) may provide an indication that registration has occurred. In step 624, the access and mobility management function 250 of a network provider (e.g., one of the network providers 210, 230) sends a request to create a session management function or connect with the session management function 252 of a network provider (e.g., one of the network providers 210, 230) to establish a tunnel for the user equipment 102 over the user plane function 270 of a network provider (e.g., one of the network providers 210, 230). In step 626, the user plane function 270 may exchange or update subscription information with the unified data management function 636 (UDM) of a network provider (e.g., one of the network providers 210, 230). In step 628, a response to the creation of the session context is sent to the network repository function 634 of a network provider (e.g., one of the network providers 210, 230). In step 630, a PDU session, or another type of session, is established with authentication and authorization credentials to the data network. It should be appreciated that the PDU session created in step 630 may connect to the proxy 112 associated with the user plane function 270. In such a way, the proxy 112, as discussed herein, may receive a data over one or more paths associated with the first network provider and one or more paths associated with the second network provider of which examples are shown in architectures described herein.

It should be appreciated that selection of the policy control function 254 may be performed along with selection of the user plane function 270. The session management function 252 of a network provider (e.g., one of the network providers 210, 230) may also establish an N4 interface with the user plane function 270 and establish N1 and N2 interface message transfer with the access and mobility management function 250 of a network provider (e.g., one of the network providers 210, 230). The access and mobility management function 250 of a network provider (e.g., one of the network providers 210, 230) may also send an N2 interface request to the radio access network 212 of the first network provider 210, allocating resources for the user equipment 102. The radio access network 212 may then confirm the resource allocation to the access and mobility management function 250 of a network provider (e.g., one of the network providers 210, 230). After updating or modifying the N4 interface and the PDU session with registration credentials, the session management function 252 of a network provider (e.g., one of the network providers 210, 230) may send address information to the user plane function 270 and the user equipment 102.

Figure 7:
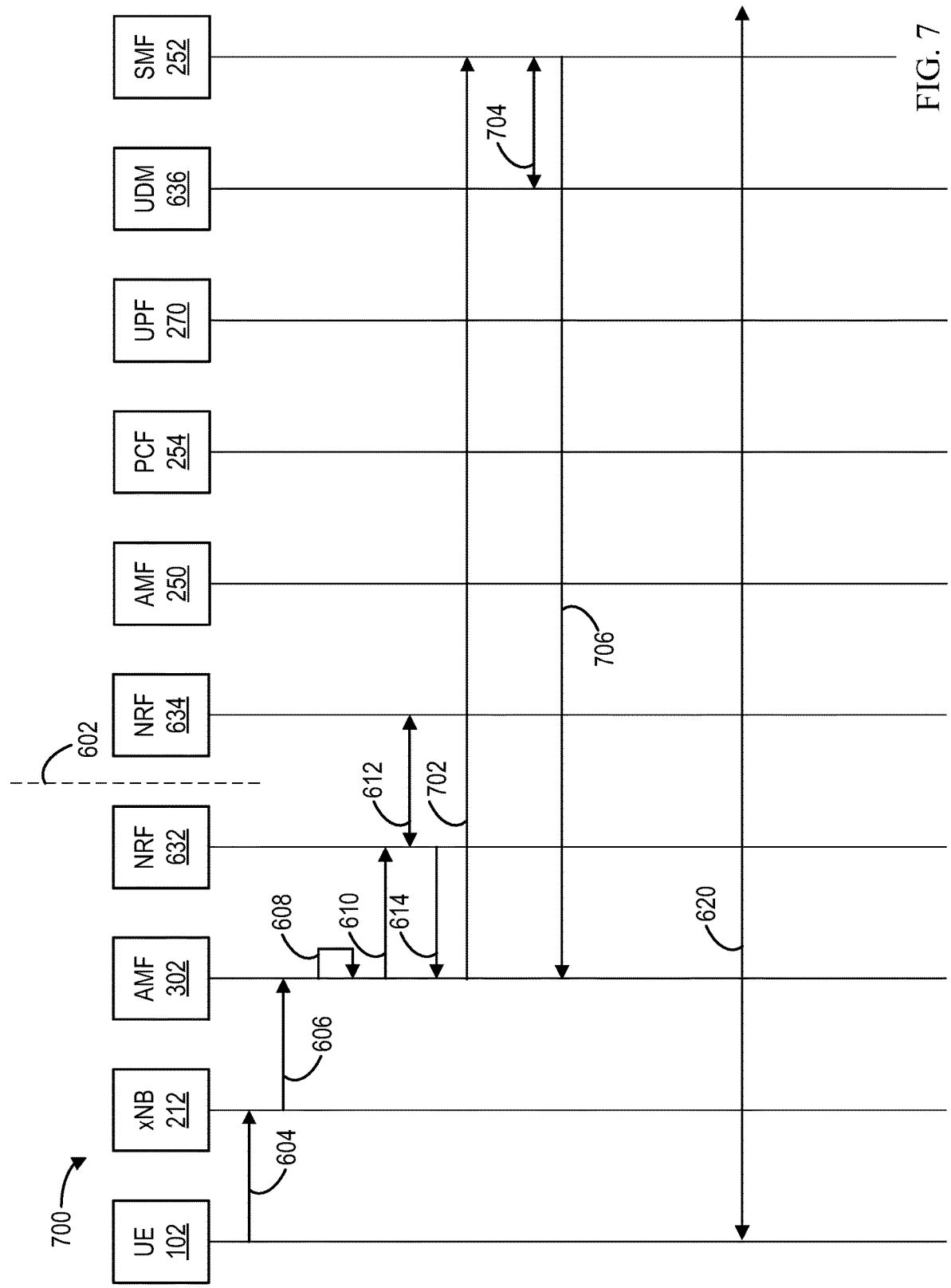
FIG. 7 illustrates an example call flow associated with establishing a session based on a session management function in accordance with one or more implementations of the present disclosure.

In FIG. 7, an example call flow 700 associated with establishing a session based on a session management function in accordance with one or more implementations of the present disclosure is shown. The call flow 700 includes calls between entities of the network providers (e.g., network provider 210, 230). The network providers 210, 230 have a variety of functions that are organized by divider 602. In step 604 the user equipment 102 sends a session request to the network provider 210 through the radio access network to the access and mobility management function 302 of a network provider (e.g., one of the network providers 210, 230) in step 606. The access and mobility management function 302 of a network provider (e.g., one of the network providers 210, 230) may recognize a non-native globally unique temporary identifier (GUTI) and access traffic steering, switching, and splitting (ATSSS). Based on determining that the user equipment 102 is configured for ATSSS in step 608, the access and mobility management function 302 of a network provider (e.g., one of network providers 210, 230) may send messages to determine whether other networks (e.g., network provider 230) are available for establishing a connection.

As an example, in step 610 the access and mobility management function 302 of a network provider (e.g., one of the network providers 210, 230) sends a discovery request to the network repository function 632 of a network provider (e.g., one of the network providers 210, 230), initiating a discovery request between the network repository function 632 of a network provider (e.g., one of the network providers 210, 230) and the network repository function 634 of a network provider (e.g., one of the network providers 210, 230) in step 612. The request may include generation of any network functions needed to perform ATSSS. A discovery response may be sent from the network repository function 634 of a network provider (e.g., one of the network providers 210, 230) to the network repository function 632 of a network provider (e.g., one of the network providers 210, 230). In step 614 the network repository function 632 of a network provider (e.g., one of the network providers 210, 230) may send the discovery response to the access and mobility management function 302 of a network provider (e.g., one of the network providers 210, 230).

In step 702, a request for the PDU session is sent from the access and mobility management function 302 of a network provider (e.g., one of the network providers 210, 230) over an N11 interface to the session management function 252 of a network provider (e.g., one of the network providers 210, 230). The N11 interface may be a static tunnel (e.g., statically-addressed tunnel) formed between the first network provider 210 and the second network provider 230 to create the context for the session. In step 704, the session management function 252 of a network provider (e.g., one of the network providers 210, 230) may determine the subscription information from the unified data management function 636. The subscription information may be updated. In step 706 the context response is returned to the access and mobility management function 302 of a network provider (e.g., one of the network providers 210, 230) over the N11 interface.

In step 630, a PDU session is established with authentication and authorization credentials to the data network. It should be appreciated that the PDU session created in step 630 may connect to the proxy 112 associated with the user plane function 270. In such a way, the proxy 112, as discussed herein, may receive a data over one or more paths associated with the first network provider and one or more paths associated with the second network provider of which examples are shown in FIGS. 2-4.

It should be appreciated that selection of the policy control function 254 may be performed along with selection of the user plane function 270 of a network provider (e.g., one of the network providers 210, 230), enabling the session management function 252 of a network provider (e.g., one of the network providers 210, 230) to communicate directly over a static tunnel with the user plane function 270 of a network provider (e.g., one of the network providers 210, 230). In such a way, different levels of aggregation may be provided with respect to the call flow 600 and the call flow 700. The session management function 252 of a network provider (e.g., one of the network providers 210, 230) may also establish an N4 interface with the user plane function 270 of a network provider (e.g., one of the network providers 210, 230) and establish an N11 interface with the access and mobility management function 302 of a network provider (e.g., one of the network providers 210, 230). The access and mobility management function 302 of a network provider (e.g., one of the network providers 210, 230) may also send an N2 interface request to the radio access network 212, which may include interworking function, of the first network provider 210, allocating resources for the user equipment 102. The radio access network 212 may then confirm the resource allocation to the access and mobility management function 302 of a network provider (e.g., one of the network providers 210, 230). After updating or modifying the N4 interface and the PDU session with registration credentials, the session management function 252 of a network provider (e.g., one of the network providers 210, 230) may send address information to the user plane function 270 of a network provider (e.g., one of the network providers 210, 230) and the user equipment 102.

Figure 8:
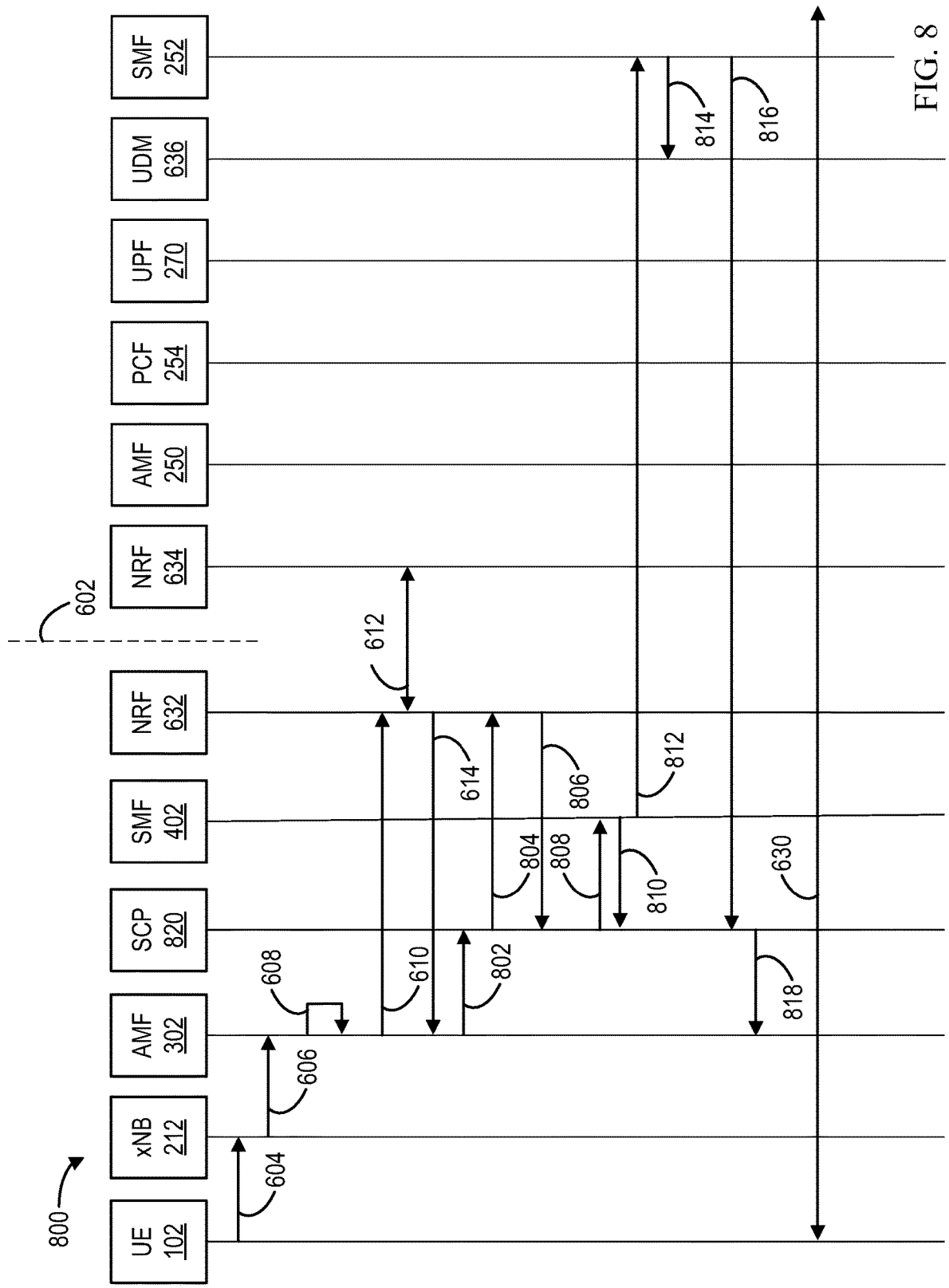
FIG. 8 illustrates an example call flow associated with establishing a session based on session management functions of separate networks in accordance with one or more implementations of the present disclosure.

In FIG. 8, an example call flow 800 associated with establishing a session based on session management functions 252, 402 of separate networks of the network providers 210, 230 in accordance with one or more implementations of the present disclosure is shown. The call flow 800 includes calls between entities of the network providers (e.g., network provider 210, 230). The network providers 210, 230 have a variety of functions that are organized by divider 602. In step 604 the user equipment 102 sends a session request to the network provider 210 through the radio access network to the access and mobility management function 302 of a network provider (e.g., one of network providers 210, 230) in step 606. The access and mobility management function 302 of a network provider (e.g., one of network providers 210, 230) may recognize a non-native globally unique temporary identifier (GUTI) and access traffic steering, switching, and splitting (ATSSS). Based on determining that the user equipment 102 is configured for ATSSS in step 608, the access and mobility management function 302 of a network provider (e.g., one of the network providers 210, 230) may send messages to determine whether other networks (e.g., network provider 230) are available for establishing a connection.

As an example, in step 610 the access and mobility management function 302 of a network provider (e.g., one of the network providers 210, 230) sends a discovery request to the network repository function 632 of a network provider (e.g., one of network providers 210, 230), initiating a discovery request between the network repository function 632 of a network provider (e.g., one of the network providers 210, 230) and the network repository function 634 of a network provider (e.g., one of the network providers 210, 230) in step 612. The request may include generation of any network functions needed to perform ATSSS. A discovery response may be sent from the network repository function 634 of a network provider (e.g., one of the network providers 210, 230) to the network repository function 632 of a network provider (e.g., one of network providers 210, 230). In step 614, the network repository function 632 of a network provider (e.g., one of the network providers 210, 230) may send the discovery response to the access and mobility management function 302 of a network provider (e.g., one of the network providers 210, 230).

In step 802, the access and mobility management function 302 of a network provider (e.g., one of the network providers 210, 230) may send a session request to the service communication proxy (SCP) 820. In step 804, the service communication proxy 820 may communicate with the network repository function 632 of a network provider (e.g., network providers 210) to obtain information regarding the availability of network functions of the other network provider 230 retrieved from the network repository function 634 of a network provider (e.g., one of the network providers 210, 230). In step 806, the response from the network repository function 632 of a network provider (e.g., one of the network providers 210, 230) is received by the service communication proxy 820. In step 808, the service communication proxy 820 requests creation of PDU session context with the session management function 402 of a network provider (e.g., one of the network providers 210, 230). In step 810, the context is received by the service communication proxy 820 from the session management function 402 of a network provider (e.g., one of the network providers 210, 230). In step 812, the session management function 402 of a network provider (e.g., one of the network providers 210, 230) communicates with the session management function 252 of a network provider (e.g., one of the network providers 210, 230) over an N16 interface. The N16 interface may be established through a static route between the first network provider 210 and the second network provider 230. As such, the session management function 402 of a network provider (e.g., one of the network providers 210, 230) may send the PDU session context information to the session management function 252 of a network provider (e.g., one of the network providers 210, 230). In step 814, subscription information may be retrieved or updated from the unified data management function 636, and in step 816, the create session context response is sent to the service communication proxy 820. In step 818, the response is forwarded from the service communication proxy 820 to the access and mobility management function 302 of a network provider (e.g., one of the network providers 210, 230).

In step 630, a PDU session is established with authentication and authorization credentials to the data network. It should be appreciated that the PDU session created in step 630 may connect to the proxy 112 associated with the user plane function 270 of a network provider (e.g., one of the network providers 210, 230) through the user plane function 304 of a network provider (e.g., one of the network providers 210, 230) over an N9 interface. In such a way, the proxy 112, as discussed herein, may receive a data over one or more paths associated with the first network provider and one or more paths associated with the second network provider of which examples are shown in FIGS. 2-4 and throughout this disclosure.

It should be appreciated that selection of the policy control function 254 may be performed along with selection of the user plane function 304 of a network provider (e.g., one of network providers 210, 230), enabling the session management function 252 of a network provider (e.g., one of the network providers 210, 230) to communicate directly over a static tunnel with the user plane function 304 of a network provider (e.g., one of the network providers 210, 230). In such a way, different levels of aggregation may be provided with respect to the call flow 600 and the call flow 700. The session management function 252 of a network provider (e.g., one of the network providers 210, 230) may also establish an N4 interface with the user plane function 304 of a network provider (e.g., one of the network providers 210, 230) and establish an N11 interface with the access and mobility management function 302 of a network provider (e.g., one of the network providers 210, 230). The access and mobility management function 302 of a network provider (e.g., one of the network providers 210, 230) may also send an N2 interface request to the radio access network 212 of the first network provider 210, allocating resources for the user equipment 102. The radio access network 212 may then confirm the resource allocation to the access and mobility management function 302 of a network provider (e.g., one of the network providers 210, 230). After updating or modifying the N4 interface and the PDU session with registration credentials, the session management function 252 of a network provider (e.g., one of the network providers 210, 230) may send address information to the user plane function 304 of a network provider (e.g., one of the network providers 210, 230) and the user equipment 102.

Figure 9:
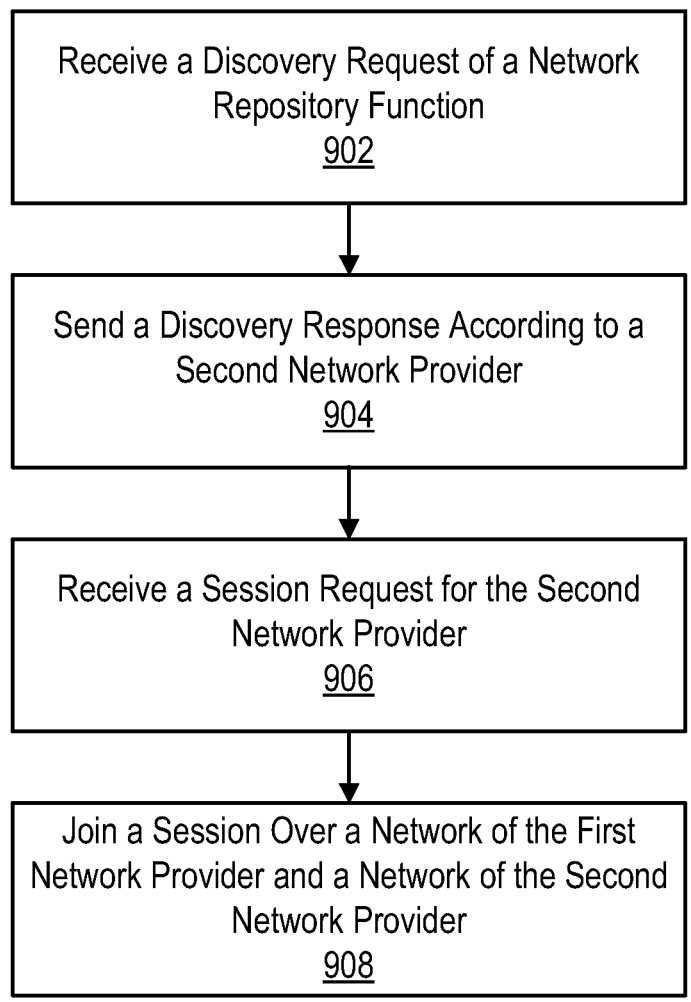
FIG. 9 illustrates an example method of a call flow in accordance with one or more implementations of the present disclosure.

Referring to FIG. 9, an example method 900 of a call flow in accordance with one or more implementations of the present disclosure is shown. In step 902, a discovery request of a network repository function (e.g., network repository function 632, 634) may be received. The network repository function may be based on a session request of a first network provider (e.g., 210) from user equipment 102. In step 904, a discovery response may be sent. The discovery response may be based on a discovery request. The discovery response may be according to a second network provider (e.g., 230). In step 906, a session request may be received. The request may be for the second network provider (e.g., 230). The session request may be based on the discovery response.

In step 908, a PDU session may be established over a network of the first network provider (e.g., 210) and a network of the second network provider (e.g., 230). As an example, the network may be or include any of the network functions or components associated with a respective network provider 210, 230. For instance, the network of the first network provider may include the radio access network 212. As another example, the network of the second network provider may include the user plane function 270. A path that traverses a network of the first network provider and a network of the second network provider (e.g., one of the network providers 210, 230) may be established. As another example, the user equipment 102 may further establish an IEEE 802.11 session over the network of the second network provider (e.g., network provider 230). One of the networks may include an access point (e.g., access point 234). The IEEE 802.11 session and the PDU session may be based on an identifier. The identifier may define a multipath connection associated with the proxy 112. In such a way, the multipath connection may enable the proxy 112 to receive data over the first network provider 210 with the 3GPP connection and data over the second network provider 230 with the 802.11 connection. The proxy 112 may further enable a connection over the radio access network 232 of the second network provider 230, defining three paths to the proxy 112 from the user equipment 102.

The method 900 may further include sending an identity request to the user equipment and receiving an identity or an identifier from the user equipment 102. As an example, the user equipment 102 may establish an interface over the user plane function of the first network provider (e.g., network provider 210) to one or more of the application servers 114, 116.

As an example, the network repository functions 632, 634 may receive a query containing information to determine session management functions available on the respective networks of the network providers 210, 230. Since the network functions may operate as one or more instances, the network repository functions 632, 634 may serve as a ledger identifying which network functions are available and where the network functions are located, enabling generation of network functions based on the query or identification of network functions based on the query.

The user equipment 102 may send data over one more paths that may comprise the first network provider 210, the second network provider 230, and combinations thereof. As such, the data from user equipment 102 may be allocated, equally or unequally, on the paths to the proxy 112 and combined by the proxy 112. The combination may be sent to the application server (e.g., 114, 116) as a single session.

Figure 10:
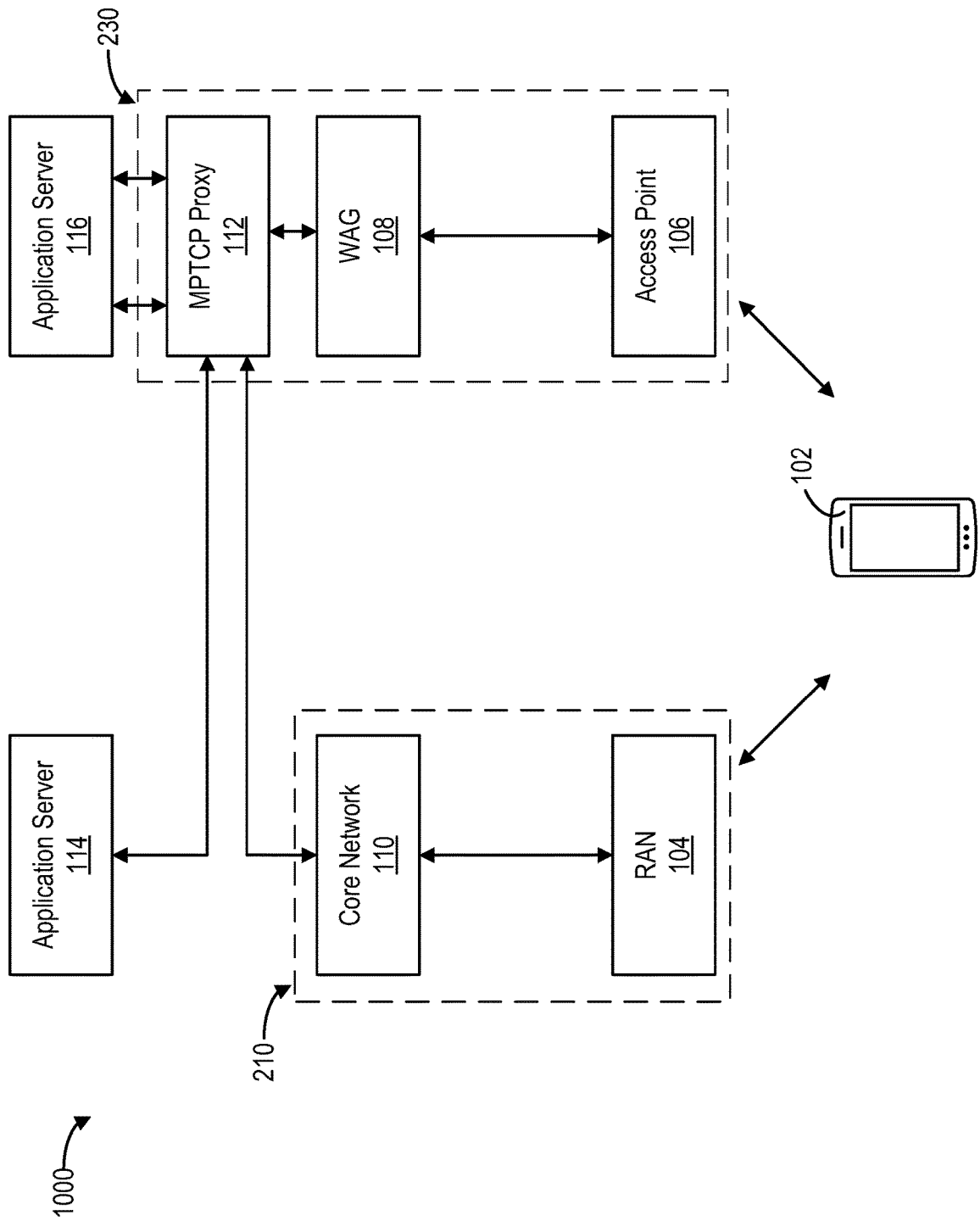
FIG. 10 illustrates an example method of a call flow in accordance with one or more implementations of the present disclosure.

Referring to FIG. 10, an example architecture 1000 associated with a multipath connection to one or more application servers 114, 116 in accordance with one or more implementations of the present disclosure. The architecture 100 defines communication paths between user equipment 102 and one of the application servers 114, 116. The user equipment 102 may be various devices configured to communicate over electromagnetic waves or other mediums. The communication paths may include wired communication technologies, wireless communication technologies, or combinations thereof. Wireless communication technologies may include various 3GPP standards (e.g., LTE, 5G) and IEEE standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Communications protocols contemplated herein may be connectionless or connection-based. For example, Transmission Control Protocol (TCP) may be used to establish a state-based or connection-based communication between a client (e.g., user equipment 102) and a server (e.g., application servers 114, 116). A protocol may define header and payload information for packets of information. Headers may define various configurations and settings associated with the transmitted payload. For instance, an option may be used to indicate a multipath protocol is being used. The multipath option may be indicative of a true state that indicates that multipath is required. Another multipath option may be indicative that multipath communication is required for communication with the user equipment 102 while the application server 114 requires a unitary path or the application server 116 can accept a multipath. As an example, the multipath option may be numerical, indicating whether the user equipment 102 requires multipath communication with the proxy 112 and whether the application servers 114, 116 require multipath communication with the proxy 112. The user equipment 102, the proxy 112, the application servers 114, 116, or combinations thereof may specify the multipath option. For instance, the multipath option may be bartered for or agreed upon by the one or more of the user equipment 102, the proxy 112, or the application servers 114, 116.

As such, a communication path may be established between user equipment 102 and one or more of the application servers 114, 116, through the proxy 112 over a network having a 3GPP or cellular access point. A 3GPP network may include wireless communication protocols between user equipment 102 and the 3GPP base station 104 (e.g., eNB, gNB, xNB), which may be part of a radio access network based on various radio access technologies. The radio access network may be associated with a network provider. A network provider 210 (e.g., a PLMN) may maintain the radio access network and the associated core network 110. The network provider may issue subscriptions for the user equipment 102 or the application servers 114, 116 to access the network. The network may include communications hardware and software to support various protocols and components (e.g., 3GPP, 802.11).

Another communication path may be established between user equipment 102 and one or more of the application servers 114, 116, through the proxy 112 over a network having a WiFi or 802.11 access point 106. The access point 106 may be configured to communicate with a wireless access gateway 108. The wireless access gateway 108 may route data packets from the access point 106 to the proxy 112. A network provider may maintain the access point 106 and the associated wireless access gateway 108. The network provider 230 (e.g., PLMN) may issue subscriptions for the user equipment 102 or the application servers 114, 116 to access the network. The network provider associated with the access point 106 may be different than the network provider associated with the radio access network.

Figure 11:
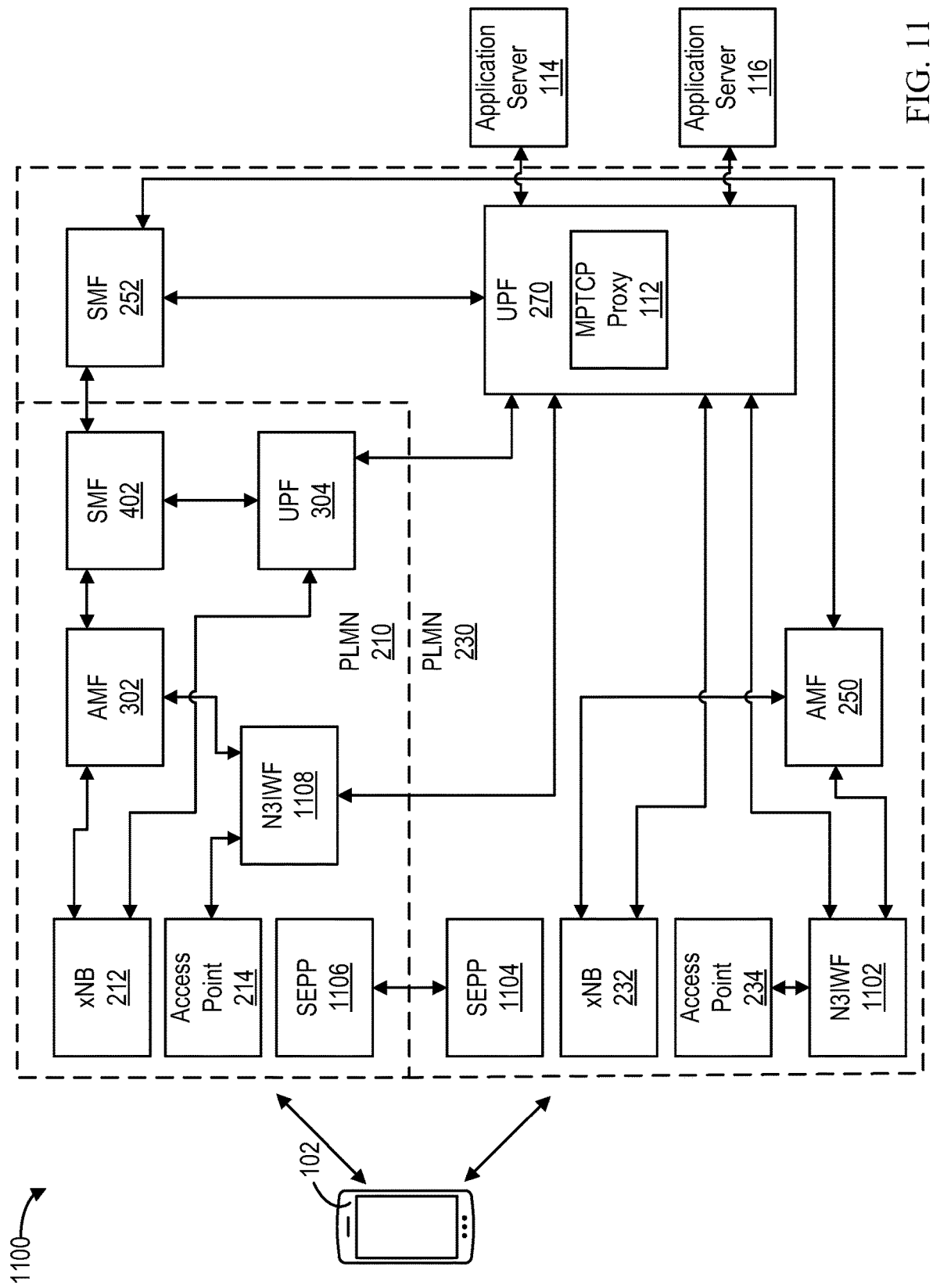
FIG. 11 illustrates an example architecture with an interworking function in accordance with one or more implementations of the present disclosure is shown.

In FIG. 11, an example architecture 1100 with an interworking function 1102 in accordance with one or more implementations of the present disclosure is shown. As in FIG. 3, each of the network providers 210, 230 have respective user plane functions 270, 304 and access and mobility management functions 250, 302. Each of the user plane functions 270, 304 may be associated with respective session management functions 252, 402. Session management functions 252, 402 exchange information regarding the multipath connection over an N16 interface and the user plane functions 270, 304 communicate over an N9 interface.

The example architecture 1100 may include an interworking function 1102. The interworking function 1102 may be a non-3GPP interworking function (N3IWF). The interworking function 1102 may be associated with an access point 234 of one of the network providers (e.g. network provider 230). Also shown is an interworking function 1108 that may be associated with an access point 214 of the other of the network providers (e.g., network provider 210). The interworking function 1102 may provide access to 3GPP functions from a non-3GPP access point. As an example, the access point 234 may be configured to communicate over IEEE 802.11 or other protocols. For example, the access point 234 may be one or more hotspots associated with a public, corporate, or otherwise access network. The interworking function 1102 may allow PDU session establishment and user plane functionalities (e.g., quality of service). In such away, the user equipment 102 may be configured to connect to a network having 3GPP functions (e.g., packet-switched gateways, user plane functions). For example, the interworking function 1102 may provide user equipment 102 access to user plane function 270. As an example, the interworking function 1102 may determine corresponding commands or instructions based on communications from the user equipment 102 sent over the access point 234 for translation to the user plane function 270.

As shown, the example architecture 1100 may include respective network providers 210, 230 having respective security edge protection proxies (SEPP) 1104, 1106. The SEPPs 1104, 1106 may provide for a path for signaling traffic across network provider. The communication between SEPPs 1104, 1106 may be authenticated and constituting all or part of an N32 interface. As an example, the user plane functions 270, 304 may establish communications over an N9 interface. The N9 interface may be encapsulated by the SEPPs 1104, 1106 and sent over the N32 interface between the two network providers 210, 230. Although shown as direct communication channels, all inter-PLMN communications may be transmitted through the N32 interface.

Figure 12:
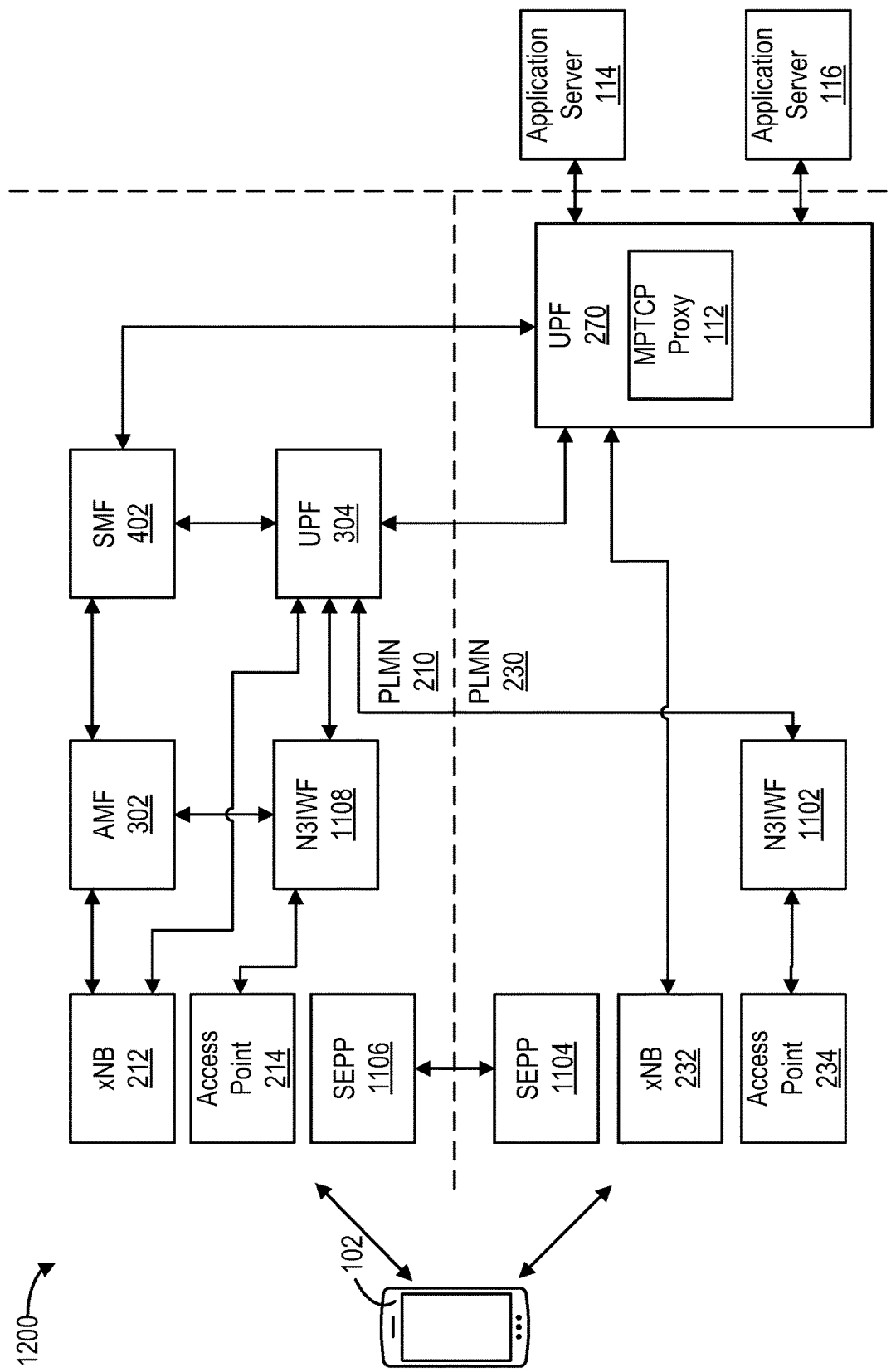
FIG. 12 illustrates an example architecture with an interworking function in accordance with one or more implementations of the present disclosure is shown.

In FIG. 12, an example architecture 1200 with an interworking function 1102 in accordance with one or more implementations of the present disclosure is shown. As in FIG. 3, each of the network providers 210, 230 have respective user plane functions 270, 304. The user plane functions 270, 304 communicate over an N9 interface. The N9 interface may be configured to transfer the SEPPs 1104, 1106 over an encrypted tunnel.

The interworking function 1102 may be configured to communicate directly with a user plane function 304 of the network provider 210 over the connection between the SEPPs, 1104, 1106.

Figure 13:
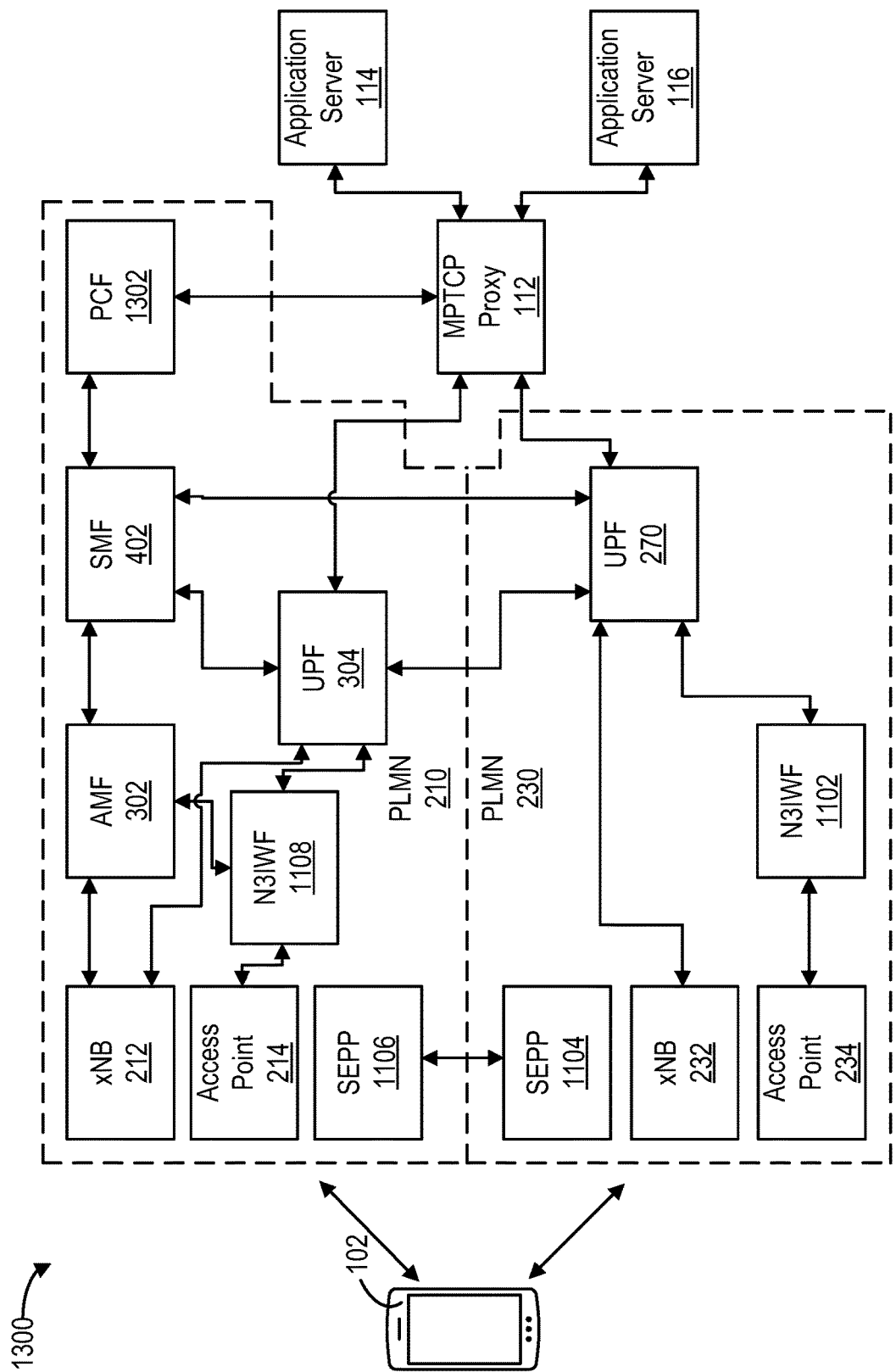
FIG. 13 illustrates an example architecture with an interworking function in accordance with one or more implementations of the present disclosure is shown

In FIG. 13, an example architecture 1300 with an interworking function 1102 in accordance with one or more implementations of the present disclosure is shown. The interworking function 1102 may be connected with the user plane function 270 of network provider 230. The interworking function 1102 may provide the user equipment 102 access to the proxy 112. The user plane functions 270, 304 may be connected over an N9 interface. The N9 interface may be encapsulated by the connection provided by SEPP 1104, 1106. The policy control function 1302 may be configured to communicate with the proxy 112 over an N6 interface while each user plane function is individually connected with the proxy 112 over respective interfaces. These interfaces may be an N6 interface, an Nx interface, or another applicable interface. As an example, the proxy 112 may be part of a data network associated with a PLMN (e.g., network provider 210, 230). The data network may be separate from a voice network associated with either of the network providers 210, 230. The proxy 112 may be part of a network independent from either of the network providers 210, 230 and hosted by a third party. As an example, the proxy 112 may be provisioned on a cloud-computing server accessible over the Internet.

In some circumstances, the interworking function 1102 or other functions may be configured to authenticate with the network provider 210. For instance, user equipment 102 may include a credential circuit comprising authentication credentials for network provider 210. The user equipment 102 may include a credential circuit comprising authentication credentials for network provider 230. The authentication credentials may provide cross-validation and access to either network provider 210, 230. For instance, the authentication credentials may be associated with network provider 230 and traverse the interworking function 1102, providing access to network provider 230 from the user equipment 102. The same authentication credentials may indicate access, from network provider 230 to network provider 210. An indication may be provided from the network provider 230 to network provider 210 indicating that access is authorized without provided credentials specific to network provider 210. In such a way, access to network provider 210 may be achieved with authentication credentials for network provider 230 or vice versa. As an example in combination or separate, the authentication credentials may be based on an eSIM or embedded SIM associated with the user equipment 102. The authentication credentials may be issued by the network provider 230 associated with the interworking function 1102. The authentication credentials may provide access to the network of the network provider 210.

Figure 14:
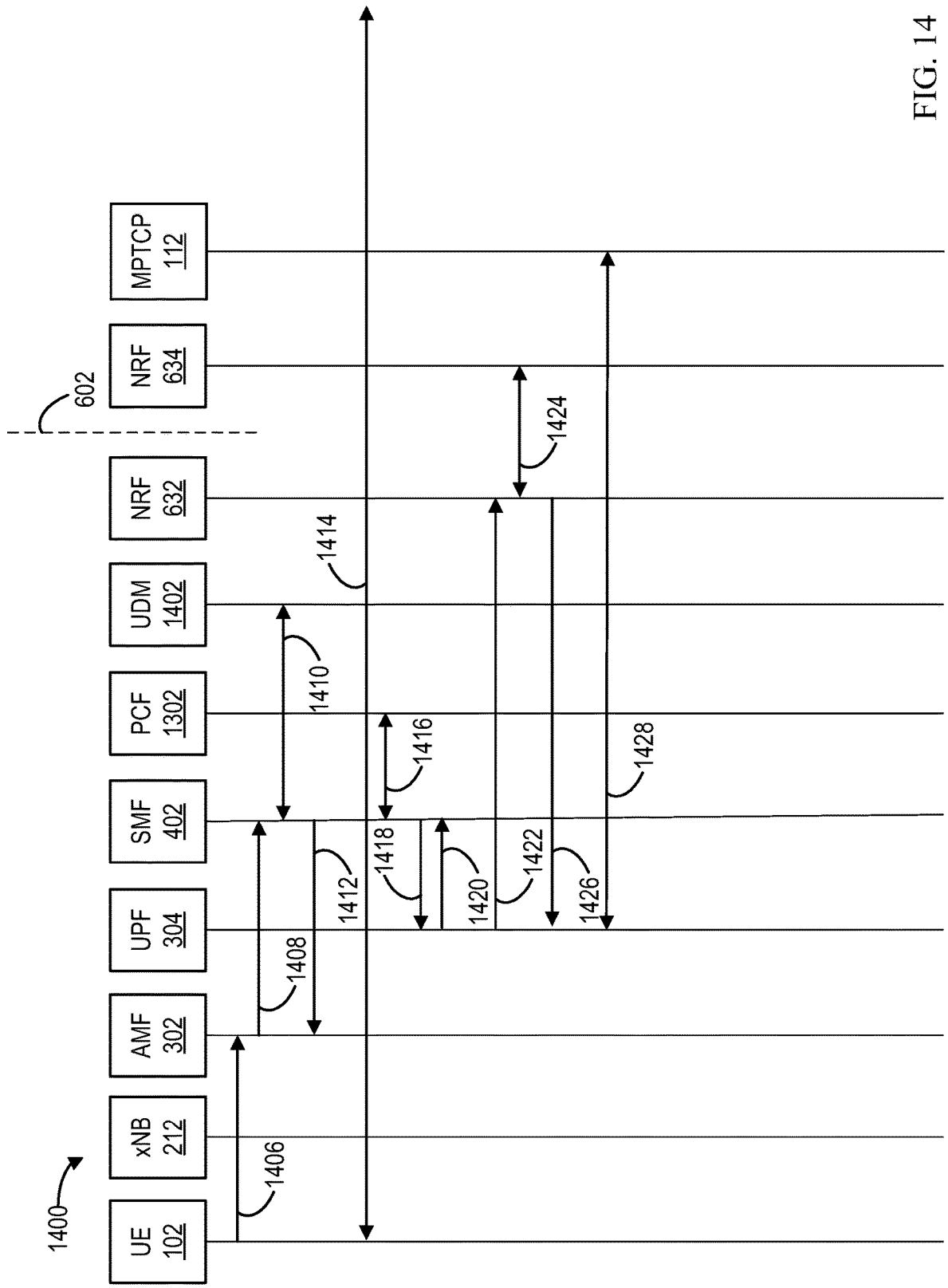
FIG. 14 illustrates an example method of a call flow in accordance with one or more implementations of the present disclosure is shown.

Referring to FIG. 14, an example method of a call flow 1400 in accordance with one or more implementations of the present disclosure is shown. The call flow 1400 includes calls between entities of the network providers (e.g., network provider 210, 230). The network providers 210, 230 have a variety of functions that are organized by divider 602. In step 1406, a session establishment request is sent to the access and mobility management function 302 over the radio access network 212. In step 1408, the access and mobility management function 302 sends a create context request to the session management function 402. The create context request may be a Nsmf_PDUSession_CreateSMContext request. In step 1410, the session management function 402 may request and receive subscription information from the unified data management function 1402, a home subscriber service, a user data repository, or combinations thereof. In step 1412, the create context response is returned to the access and mobility management function 302 allowing the PDU session to be created in step 1414 between the user equipment 102 and a data network.

In step 1416, the session context is exchanged with the policy control function 1302 of a network provider (e.g., network providers 210, 230) and the session management function 402 to create the session management policy. An N4 interface may be created between the session management function 402 and the user plane function 304 in steps 1418, 1420. For instance, the session management function 402 may send a request to the user plane function 304 requesting establishment or modification of the interface. In step 1422, the user plane function 304 may conduct a discovery of associated networks and proxy 112. As an example, the user plane function 304 may send a network-based discovery request to the network repository function 632. The network repository function 632 may send a discovery request to another network repository function 634 of the other of the network providers 210, 230 in step 1424. The network repository function 634 may then send a response indicative of the available proxy 112 on its network. In step 1426, this information is provided to the user plane function 304. In step 1428, a tunnel is established between the user plane function 304 and the proxy 112. A tunnel may be an IPSec tunnel. A tunnel may be based on a Diffie-Helman key exchange. A tunnel may be based on pre-shared keys.

Figure 15:
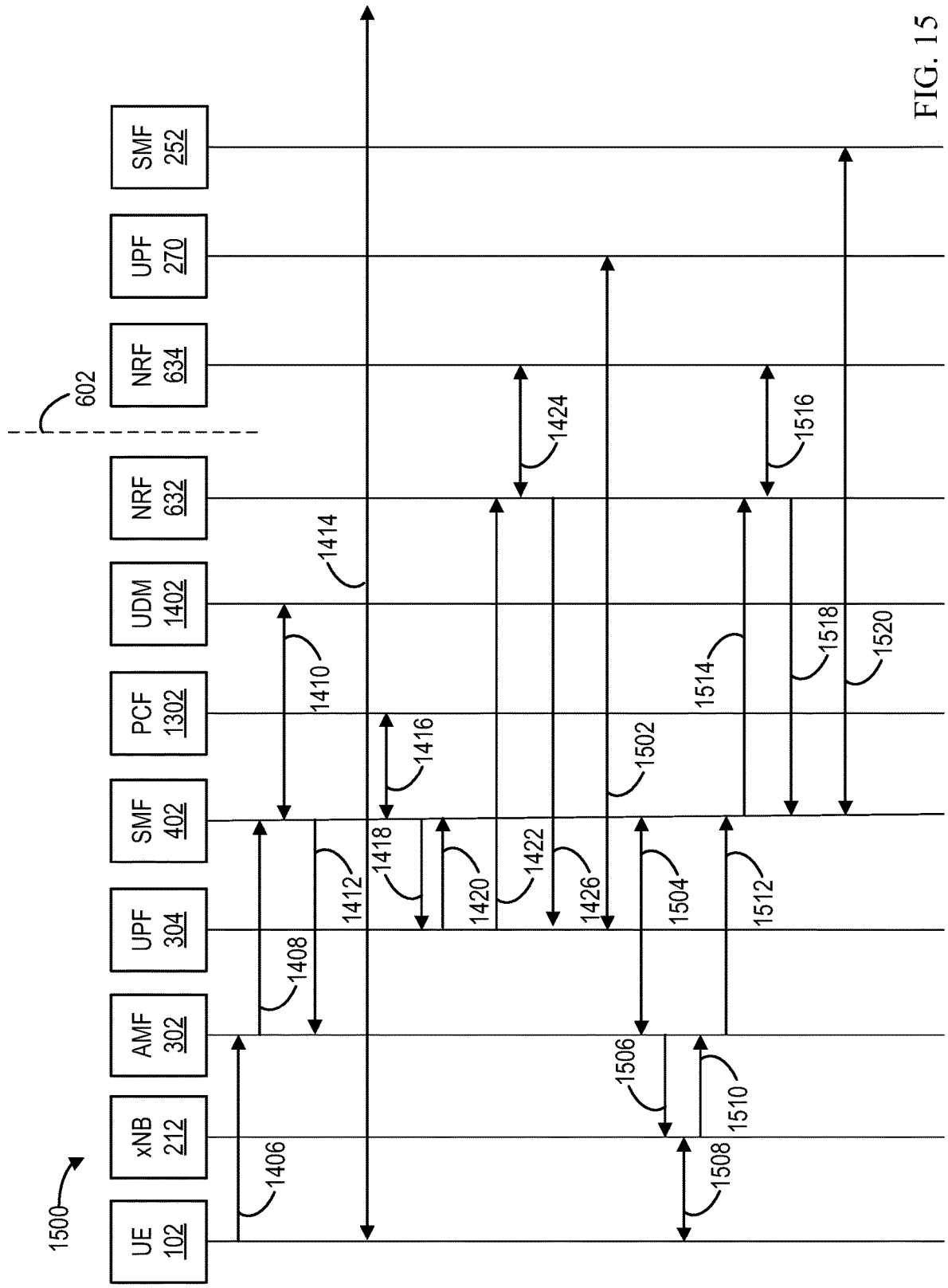
FIG. 15 illustrates an example method of a call flow in accordance with one or more implementations of the present disclosure is shown.

Referring to FIG. 15, an example method of a call flow 1500 in accordance with one or more implementations of the present disclosure is shown. The call flow 1500 includes calls between entities of the network providers (e.g., network provider 210, 230). The network providers 210, 230 have a variety of functions that are organized by divider 602. In step 1406, a session establishment request is sent to the access and mobility management function 302 over the radio access network 212. In step 1408, the access and mobility management function 302 sends a create context request to the session management function 402. The create context request may be a Nsmf_PDUSession_CreateSMContext request. In step 1410, the session management function 402 may request and receive subscription information from the unified data management function 1402, a home subscriber service, a user data repository, or combinations thereof. In step 1412, the create context response is returned to the access and mobility management function 302 allowing the PDU session to be created in step 1414 between the user equipment 102 and a data network.

In step 1416, the session context is exchanged with the policy control function 1302 and the session management function 402 to create the session management policy. An N4 interface may be created between the session management function 402 and the user plane function 304 in steps 1418, 1420. For instance, the session management function 402 may send a request to the user plane function 304 requesting establishment or modification of the interface. In step 1422, the user plane function 304 may conduct a discovery of associated networks and proxy 112. As an example, the user plane function 304 may send a network-based discovery request to the network repository function 632. The network repository function 632 may send a discovery request to another network repository function 634 of the other of the network providers 210, 230. The network repository function 634 may then send a response indicative of the available proxy 112 on its network. In step 1426, this information is provided to the user plane function 304. In step 1502, a tunnel (e.g., N9 interface or tunnel) is established between the user plane function 304 and the user plane function 270 found during the discovery evolution.

In step 1504, the session management function 402 communicates with the access and mobility management function 302 to perform the N1 interface and N2 interface message transfer. In step 1506, a session request on an N2 interface is sent from the access and mobility management function 302 to the radio access network 212 and specific resource allocation is perform for the user equipment 102 in step 1508. In step 1510, the session request response is sent over the N2 interface back to the access and mobility management function 302, and in step 1512 the access and mobility management function 302 updates the session management function 402 with session information in an update context request.

In step 1514, a discovery request is sent from the session management function 402 to the network repository function 632 to identify a session management function associated with the other of the network providers 210, 230. In step 1516, the network repository function 632 requests the identification information from the network repository function 634, and in step 1518, the information is provided to the session management function 402. In step 1520, a tunnel is formed (e.g., N16 tunnel or interface) between session management function 402 and session management function 252.

Other steps may include establishing or modifying the N4 interface between the user plane function 304 and the session management function 402. Another step may include registration with the unified data management function 1402; additional context updates between the policy control function 1302 and the user plane function 304. Internet Protocol (IP) addresses may be established from the session management function 402 to the user plane function 304 and on to the user equipment 102. Termination may be performed and the user equipment may be unsubscribed.

Figure 16:
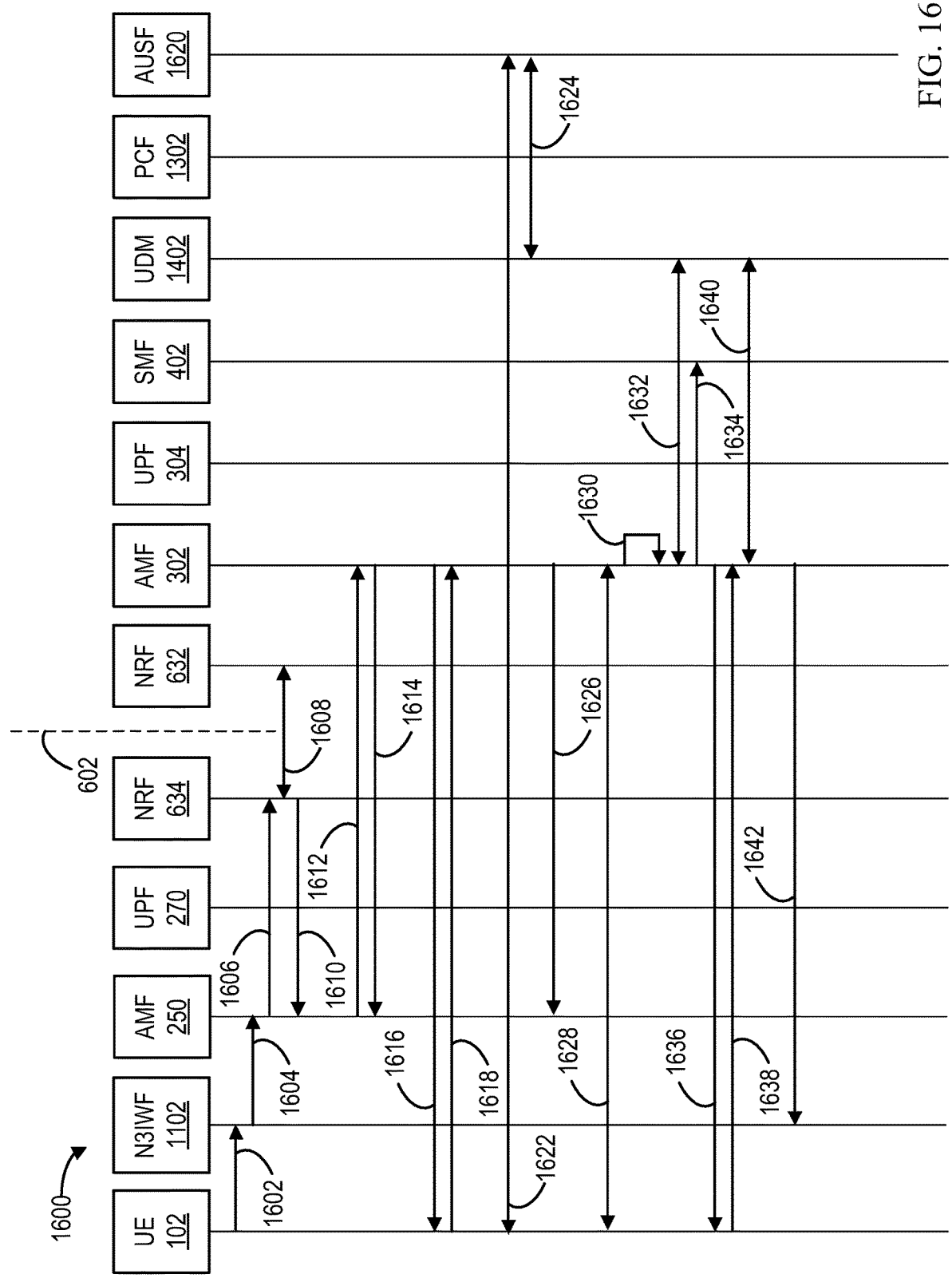
FIG. 16 illustrates an example method of a call flow in accordance with one or more implementations of the present disclosure is shown.

Referring to FIG. 16, an example method of a call flow 1600 in accordance with one or more implementations of the present disclosure is shown. The call flow 1600 includes calls between entities of the network providers (e.g., network provider 210, 230). The network providers 210, 230 have a variety of functions that are organized by divider 602. In step 1602, a request for registration on a network may be sent from the user equipment 102 to the interworking function 1102 and on to the access and mobility management function 250 in step 1604. In some applications the interworking function 1102 may be or may be combined with an xNB. A discovery request may be sent from the access and mobility management function 250 to the network repository function 634 in step 1606. In step 1608, the network repository function 634 may send a discovery request to the network repository function 634 and receive an indication for available network. The indication may be sent to the access and mobility management function 250 for available access and mobility management functions 302 of the other network provider in step 1610. In step 1612, the access and mobility management function 250 may send a context transfer request to the other access and mobility management function 302. The access and mobility management function 302 may reply by sending a response confirming acceptance of the context transfer in step 1614. In step 1616, the access and mobility management function 302 may request an identity from the user equipment 102. In step 1618, the user equipment may provide an identity response and authentication server function selection may be performed.

In step 1622, authentication, authorization, or identification credentials may be sent to the authentication server function 1620. The authentication server function 1620 may perform various validation functions. The authentication server function 1620 may be implemented with pre-configured certificates for granting access to the user equipment 102. In step 1624, authentication, authorization, or identification credentials may be exchanged, validated, or verified with the unified data management function 1402, and registration status may be provided to from the access and mobility management function 302 associated with the authentication server function 1620 in step 1626. In step 1628, an identity and request and response may be performed between the user equipment 102 and the access and mobility management function 302, allowing access of the user equipment 102 on the other one of the network providers 210, 230. In step 1630, the access and mobility management function 302 may perform an equipment identity check. The equipment identity check may be performed with an equipment identity register.

The access and mobility management function 302 exchanges registration information with the unified data management function 1402 in step 1632. The exchange may include Nudm_UE_CM_registration, Nudm_SDM_get, and Nudm_UE_CM_subscribe commands. For example, the exchanged registration information may be based on the Nudm subscriber data management service. The registration information may further include association, establishment, or modification of the policies with the policy control function 1302. In step 1634, an update to the session management context between the access and mobility management function 302 and the session management function 402 is performed. In step 1636, acceptance of the registration is sent to the user equipment 102 from the access and mobility management function 302. In step 1638, registration is completed and the user equipment policy association may be established.

In step 1640, the subscriber data management service may be updated and information provided, and in step 1642, an N2 message may be sent to the interworking function 1102 to allow the user equipment 102 to access to a network of network provider 230 based on credentials associated with the network provider 210. As such, the user equipment 102 may be registered on both network providers 210, 230. In an example, only one set of credentials is available on the user equipment 102. The credentials may be associated with only one of the network providers 210, 230. The credentials may provide access to both network providers 210, 230 through an authorization from one network provider (e.g., one of network providers 210, 230) to the other network provider (e.g., one of network providers 210, 230).

Figure 17:
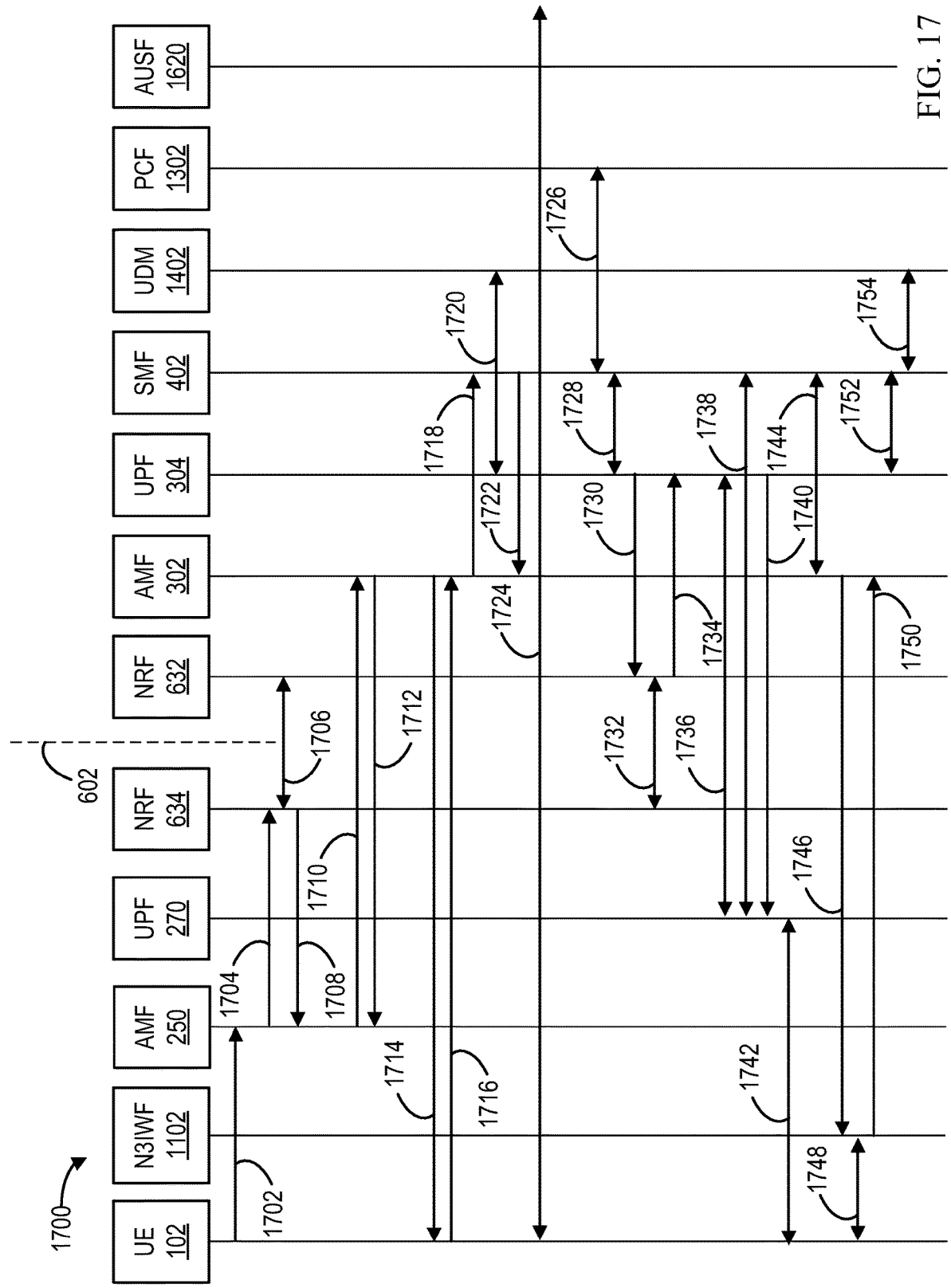
FIG. 17 illustrates an example method of a call flow in accordance with one or more implementations of the present disclosure is shown.

Referring to FIG. 17, an example method of a call flow 1700 in accordance with one or more implementations of the present disclosure is shown. The call flow 1700 includes calls between entities of the network providers (e.g., network provider 210, 230). The network providers 210, 230 have a variety of functions that are organized by divider 602. In step 1702, the user equipment 102 sends a session request to the network provider 210 through the radio access network 212 to the access and mobility management function 250 of the one of the network providers 210, 230 in step 1704. The access and mobility management function 250 of one of the network providers 210, 230 may recognize a non-native globally unique temporary identifier (GUTI) and use access traffic steering, switching, and splitting (ATSSS). Based on determining that the user equipment 102 is configured for ATSSS, the access and mobility management function 250 of the one of the network providers 210, 230 may send messages to determine whether the other networks provider is available for establishing a connection.

As an example, in step 1704 the access and mobility management function 250 of one of the network providers 210, 230 sends a discovery request to the network repository function 634, initiating a discovery request between the network repository function 634 and the network repository function 632 of the other of the network providers 210, 230 in step 1706. The request may include generation of any network functions needed to perform ATSSS. A discovery response may be sent from the network repository function 634 of one of the network providers 210, 230 to the network repository function 632 of the other of the network providers 210, 230. In step 1708, the network repository function 634 of one of the network providers 210, 230 may send the discovery response to the access and mobility management function 250 of one of the network providers 210, 230.

In step 1710, a context transfer associated with the user equipment 102 may be performed to establish the user equipment 102 on the other of the network provider 210, 230. The context transfer may include the GUTI. In step 1712, a notification of the context transfer being successful may be sent to the initial access and mobility management function 250 of one of the network providers 210, 230 from the secondary access and mobility management function 302 of the other of the network providers 210, 230.

In step 1714, the access and mobility management function 302 of the other of the network providers 210, 230 may request the identity of the user equipment 102. The user equipment 102 may provide the access and mobility management function 302 of the other of the network providers 210, 230 its identity in step 1716, enabling the user equipment 102 to exchange authentication and security credentials with the authentication server function. The access and mobility management function 302 of the other of the network providers 210, 230 may provide an indication that registration has occurred. In step 1718, the access and mobility management function 302 of the other of the network providers 210, 230 sends a request to create a session to the session management function 402 of the other of the network providers 210, 230 to establish a tunnel for the user equipment 102 over a user plane function 304 of the other of the network providers 210, 230. In step 1720, the user plane function 304 may exchange or update subscription information with the unified data management function 1402 of the other of the network providers 210, 230. In step 1722, a response to the creation of the session context is sent to the access and mobility management function 302 of the other of the network providers 210, 230. In step 1724, a PDU session is established with authentication and authorization credentials to the data network. It should be appreciated that the PDU session created in step 630 may connect to the proxy 112. In such a way, the proxy 112, as discussed herein, may receive a data over one or more paths associated with the first network provider and one or more paths associated with the second network provider of which examples are shown in architectures described herein.

It should be appreciated that selection of the policy control function 1302 may be performed along with selection of the user plane function 304. In steps 1726, 1728, the session management function 402 of the other of the network providers 210, 230 may also establish an N4 interface with the user plane function 304 and perform session management with the policy control function 1302. The access and mobility management function 250 of the network providers 210, 230 may also send an N2 interface request to the radio access network 212 of the first network provider 210, allocating resources for the user equipment 102. The radio access network 212 may then confirm the resource allocation to the access and mobility management function 250 of the network providers 210, 230. After updating or modifying the N4 interface and the PDU session with registration credentials, the session management function 402 of the other of the network providers 210, 230 may send address information to the user plane function of the other of the network providers 210, 230.

An inter-PLMN (e.g., inter-network provider) network function discovery may be initiated to establish multi-access PDU sessions for a capable PDU session anchor on the user plane function 304 of the network providers 210, 230. In order to back-establish a connection between the user equipment 102 and the user plane function 270 that was not associated with the credentials and provided with authorization credentials from the other of the network providers 210, 230.

The user plane function 304 of the other of the network providers 210, 230 may send a discovery request to the network repository function 632 of the other of the network providers 210, 230 in step 1730. In step 1732, the network repository function 632 of the other of the network providers 210, 230 performs a discovery request exchange with the network repository function 634 of the network providers 210, 230. After establishing the available user plane function 270 of the network providers 210, 230, the network repository function 632 of the network providers 210, 230 provides an indication to the user plane function 304 of the available user plane functions (e.g., user plane function 270) in step 1734. The user plane function 270 may establish a tunnel with the session management function 402 in step 1738. The tunnel may be an N4 interface. The user plane functions 270, 304 establish a tunnel based on the discovery from the network repository functions 634, 632 in step 1736. The tunnel may be an N9 interface.

In step 1740, the context associated with the user equipment 102 on the user plane function 304 is transferred to the user plane function 270. In step 1742, the user equipment establishes a tunnel with user plane function 270. The tunnel may be an N3 interface. In such a way, a path may be established from the user equipment 102 to the proxy 112 over a network that the user equipment lacks credentials to access directly. User equipment 102 with access to the network provider 210 (e.g., a cellular network) may gain access to the network provider 230 having an interworking function 1102 and seamlessly provide more than one path to the proxy 112 over the network provider 210 and the network provider 230. For instance, data may be offloaded to the interworking function 1102 with access to the proxy 112 when in range of the access point 234 and without loss in session, transfer data over the network provider 210 when the access point 234 is out of range.

In step 1744, the session management function 402 sends a request to the access and mobility management function 302 to request an N1N2 message transfer. Such a transfer may include details such as PDU session identifiers, N2 session management information, N3 tunnel information, address resolution protocol information (e.g., MAC address lists), and other pertinent information. In step 1746, the access and mobility management function 302 requests a session from the interworking function 1102. The interworking function 1102 then allocates resources for the user equipment 102 in step 1748 and sends the session response back to the access and mobility management function 302 in step 1750. The access and mobility management function 302 may provide an update to the session management context. In step 1752, the user plane function 304 and the session management function 402 may establish the N4 interface. In step 1754, the session management function 402 may register with the unified data management function 1402.

Figure 18:
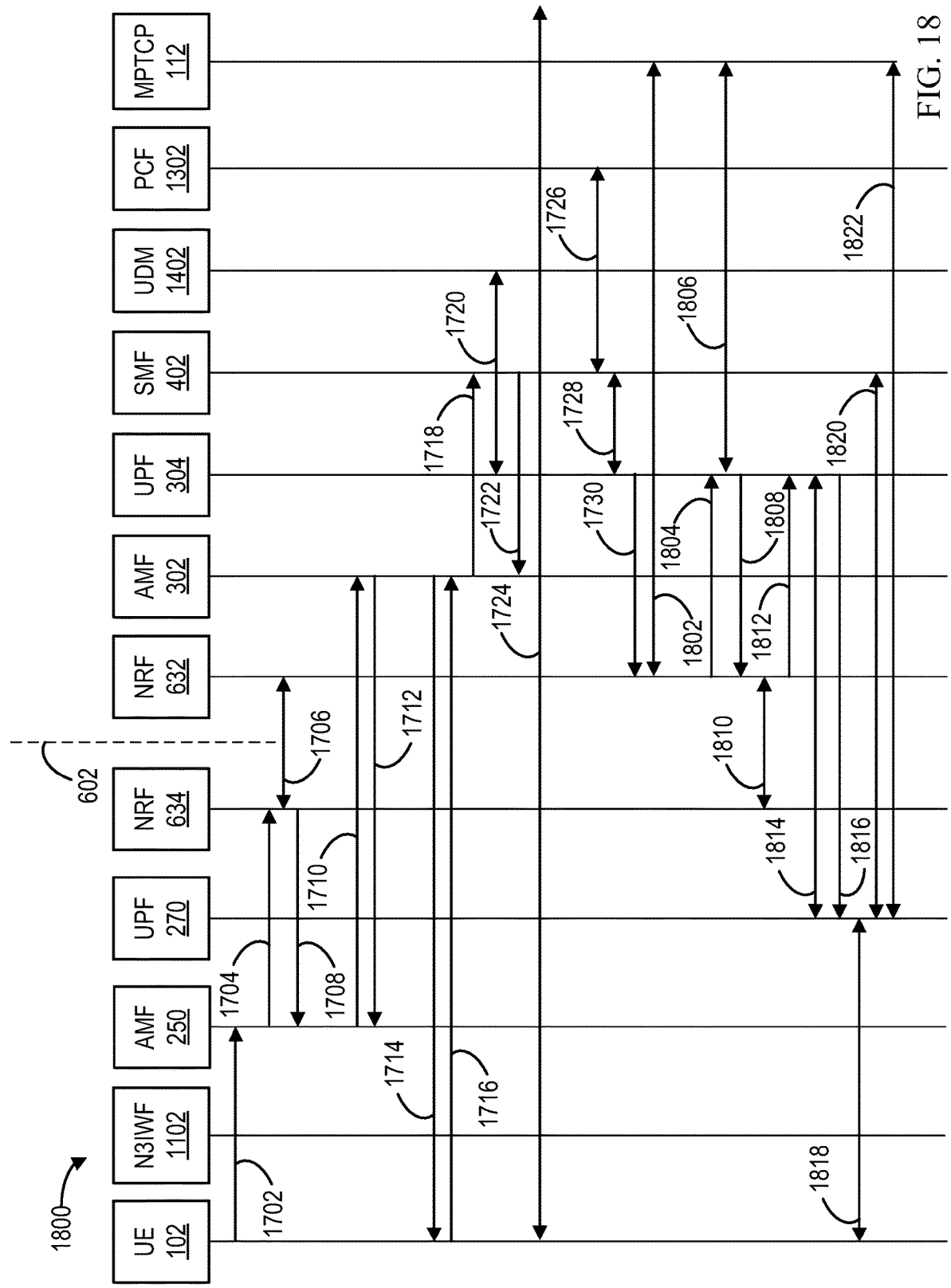
FIG. 18 illustrates an example method of a call flow in accordance with one or more implementations of the present disclosure is shown.

Referring to FIG. 18, an example method of a call flow 1800 in accordance with one or more implementations of the present disclosure is shown. The call flow 1800 includes calls between entities of the network providers (e.g., network provider 210, 230). The network providers 210, 230 have a variety of functions that are organized by divider 602. In step 1702, the user equipment 102 sends a session request to the network provider 210 through the radio access network 212 to the access and mobility management function 250 of the one of the network providers 210, 230 in step 1704. The access and mobility management function 250 of one of the network providers 210, 230 may recognize a non-native globally unique temporary identifier (GUTI) and use access traffic steering, switching, and splitting (ATSSS). Based on determining that the user equipment 102 is configured for ATSSS, the access and mobility management function 250 of the one of the network providers 210, 230 may send messages to determine whether the other networks provider is available for establishing a connection.

As an example, in step 1704 the access and mobility management function 250 of one of the network providers 210, 230 sends a discovery request to the network repository function 634, initiating a discovery request between the network repository function 634 and the network repository function 632 of the other of the network providers 210, 230 in step 1706. The request may include generation of any network functions needed to perform ATSSS. A discovery response may be sent from the network repository function 634 of one of the network providers 210, 230 to the network repository function 632 of the other of the network providers 210, 230. In step 1708, the network repository function 634 of one of the network providers 210, 230 may send the discovery response to the access and mobility management function 250 of one of the network providers 210, 230.

In step 1710, a context transfer associated with the user equipment 102 may be performed to establish the user equipment 102 on the other of the network provider 210, 230. The context transfer may include the GUTI. In step 1712, a notification of the context transfer being successful may be sent to the initial access and mobility management function 250 of one of the network providers 210, 230 from the secondary access and mobility management function 302 of the other of the network providers 210, 230.

In step 1714, the access and mobility management function 302 of the other of the network providers 210, 230 may request the identity of the user equipment 102. The user equipment 102 may provide the access and mobility management function 302 of the other of the network providers 210, 230 its identity in step 1716, enabling the user equipment 102 to exchange authentication and security credentials with the authentication server function. The access and mobility management function 302 of the other of the network providers 210, 230 may provide an indication that registration has occurred. In step 1718, the access and mobility management function 302 of the other of the network providers 210, 230 sends a request to create a session to the session management function 402 of the other of the network providers 210, 230 to establish a tunnel for the user equipment 102 over a user plane function 304 of the other of the network providers 210, 230. In step 1720, the user plane function 304 may exchange or update subscription information with the unified data management function 1402 of the other of the network providers 210, 230. In step 1722, a response to the creation of the session context is sent to the access and mobility management function 302 of the other of the network providers 210, 230. In step 1724, a PDU session is established with authentication and authorization credentials to the data network. It should be appreciated that the PDU session created in step 630 may connect to the proxy 112. In such a way, the proxy 112, as discussed herein, may receive a data over one or more paths associated with the first network provider and one or more paths associated with the second network provider of which examples are shown in architectures described herein.

It should be appreciated that selection of the policy control function 1302 may be performed along with selection of the user plane function 304. In steps 1726, 1728, the session management function 402 of the other of the network providers 210, 230 may also establish an N4 interface with the user plane function 304 and perform session management with the policy control function 1302. The access and mobility management function 250 of the network providers 210, 230 may also send an N2 interface request to the radio access network 212 of the first network provider 210, allocating resources for the user equipment 102. The radio access network 212 may then confirm the resource allocation to the access and mobility management function 250 of the network providers 210, 230. After updating or modifying the N4 interface and the PDU session with registration credentials, the session management function 402 of the other of the network providers 210, 230 may send address information to the user plane function of the other of the network providers 210, 230.

An inter-PLMN (e.g., inter-network provider) network function discovery may be initiated to establish multi-access PDU sessions for a capable PDU session anchor on the user plane function 304 of the network providers 210, 230. In order to back-establish a connection between the user equipment 102 and the user plane function 270 that was not associated with the credentials and provided with authorization credentials from the other of the network providers 210, 230.

The user plane function 304 of the other of the network providers 210, 230 may send a discovery request to the network repository function 632 of the other of the network providers 210, 230 in step 1730. In step 1802, the network repository function 632 sends a discovery request to the proxy 112. The proxy 112 may include an application programming interface (API) to interface with network repository functions and another cellular or internet service provider function(s). In such a way, the proxy 112 may avail itself to one or more of the network providers 210, 230 while situated on one of the network providers 210, 230 networks or situated on the cloud. Network repository functions may include static routes or proxies to connect with the proxy 112. As an example, the proxy 112 may be specifically programmed with available proxies on internal or external networks for relaying such information to the network repository functions.

After discovering the proxy 112, the network repository function 632 may provide a response to the user plane function 304 in step 1804. In step 1806, the user plane function 304 may establish a tunnel, interface, or other communication path with the proxy 112. The tunnel may be based on a Diffie-Helman key exchange or pre-shared keys.

In step 1808, the user plane function 304 may send a discovery request to the network repository function 632. The discovery request may be directed toward the network repository function 634 of the other of the network providers 210, 230 in step 1810. The network repository function 634 may provide indication of the available user plane function 270, which is provided to the user plane function 304 in step 1812. In step 1814, the user plane functions 270, 304 establish a tunnel. The tunnel may be an N9 interface. In step 1816, the user equipment context may be transferred from the user plane function 304 to the user plane function 270. With the transferred context, the user equipment 102 may establish an N3 tunnel with the user plane function 270 in step 1818. In step 1820, the user plane function 270 of the network provider 230 establishes a tunnel with the session management function 402 of the network provider 210. The user plane function 270 also establishes a tunnel with the proxy 112. The tunnel may be an IPSec tunnel. The tunnel may be based on a key exchange or pre-shared keys. In such a way, the user equipment 102 may establish a connection with the proxy 112 over a path based on the interworking function 1102 based on credentials associated with one of the network providers 210, 230 in step 1822.

Figure 19:
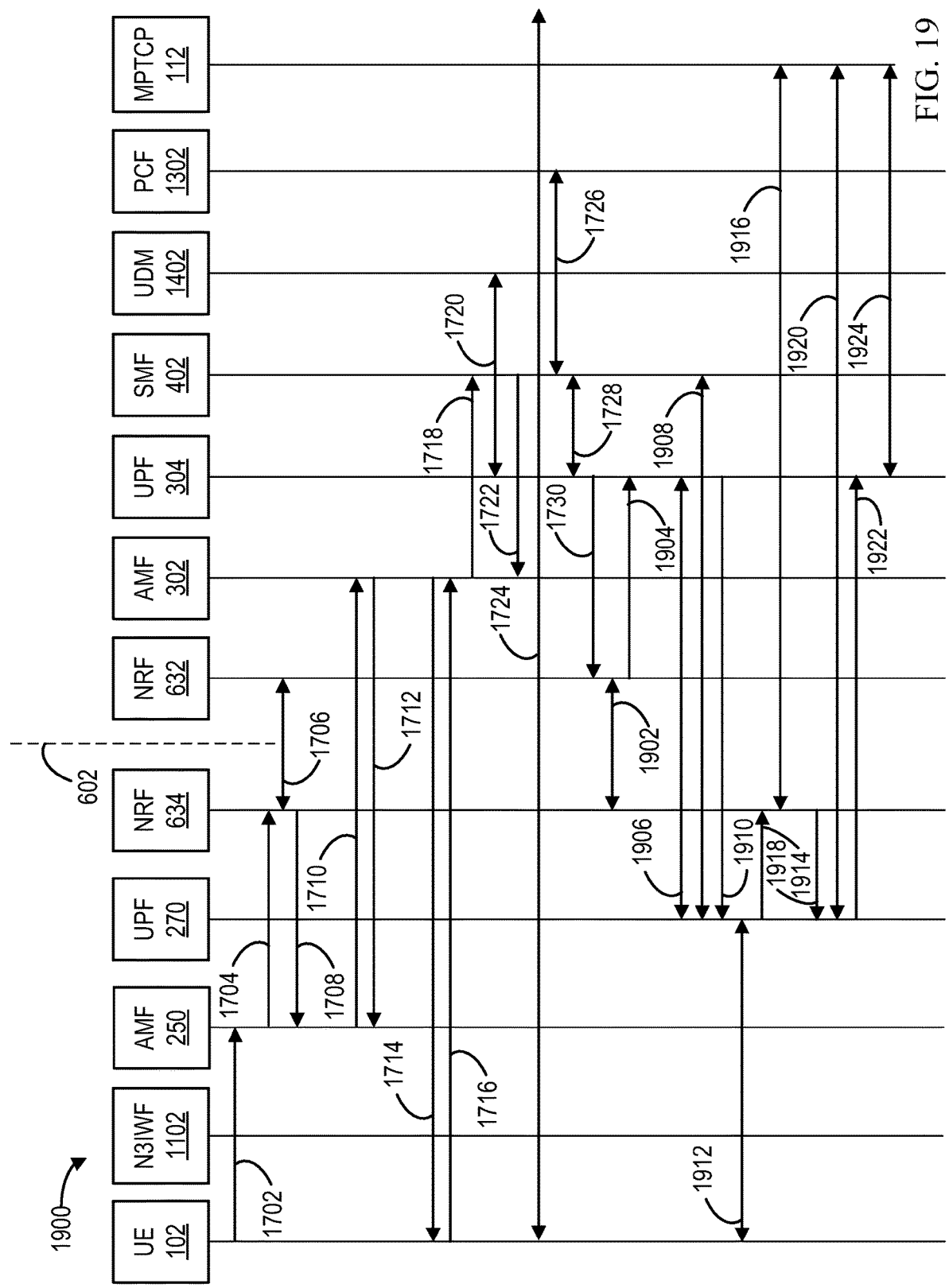
FIG. 19 illustrates an example method of a call flow in accordance with one or more implementations of the present disclosure is shown.

Referring to FIG. 19, an example method of a call flow 1900 in accordance with one or more implementations of the present disclosure is shown. The call flow 1900 includes calls between entities of the network providers (e.g., network provider 210, 230). The network providers 210, 230 have a variety of functions that are organized by divider 602. In step 1702, the user equipment 102 sends a session request to the network provider 210 through the radio access network 212 to the access and mobility management function 250 of the one of the network providers 210, 230 in step 1704. The access and mobility management function 250 of one of the network providers 210, 230 may recognize a non-native globally unique temporary identifier (GUTI) and use access traffic steering, switching, and splitting (ATSSS). Based on determining that the user equipment 102 is configured for ATSSS, the access and mobility management function 250 of the one of the network providers 210, 230 may send messages to determine whether the other networks provider is available for establishing a connection.

As an example, in step 1704 the access and mobility management function 250 of one of the network providers 210, 230 sends a discovery request to the network repository function 634, initiating a discovery request between the network repository function 634 and the network repository function 632 of the other of the network providers 210, 230 in step 1706. The request may include generation of any network functions needed to perform ATSSS. A discovery response may be sent from the network repository function 634 of one of the network providers 210, 230 to the network repository function 632 of the other of the network providers 210, 230. In step 1708, the network repository function 634 of one of the network providers 210, 230 may send the discovery response to the access and mobility management function 250 of one of the network providers 210, 230.

In step 1710, a context transfer associated with the user equipment 102 may be performed to establish the user equipment 102 on the other of the network provider 210, 230. The context transfer may include the GUTI. In step 1712, a notification of the context transfer being successful may be sent to the initial access and mobility management function 250 of one of the network providers 210, 230 from the secondary access and mobility management function 302 of the other of the network providers 210, 230.

In step 1714, the access and mobility management function 302 of the other of the network providers 210, 230 may request the identity of the user equipment 102. The user equipment 102 may provide the access and mobility management function 302 of the other of the network providers 210, 230 its identity in step 1716, enabling the user equipment 102 to exchange authentication and security credentials with the authentication server function. The access and mobility management function 302 of the other of the network providers 210, 230 may provide an indication that registration has occurred. In step 1718, the access and mobility management function 302 of the other of the network providers 210, 230 sends a request to create a session to the session management function 402 of the other of the network providers 210, 230 to establish a tunnel for the user equipment 102 over a user plane function 304 of the other of the network providers 210, 230. In step 1720, the user plane function 304 may exchange or update subscription information with the unified data management function 1402 of the other of the network providers 210, 230. In step 1722, a response to the creation of the session context is sent to the access and mobility management function 302 of the other of the network providers 210, 230. In step 1724, a PDU session is established with authentication and authorization credentials to the data network. It should be appreciated that the PDU session created in step 630 may connect to the proxy 112. In such a way, the proxy 112, as discussed herein, may receive a data over one or more paths associated with the first network provider and one or more paths associated with the second network provider of which examples are shown in architectures described herein.

It should be appreciated that selection of the policy control function 1302 may be performed along with selection of the user plane function 304. In steps 1726, 1728, the session management function 402 of the other of the network providers 210, 230 may also establish an N4 interface with the user plane function 304 and perform session management with the policy control function 1302. The access and mobility management function 250 of the network providers 210, 230 may also send an N2 interface request to the radio access network 212 of the first network provider 210, allocating resources for the user equipment 102. The radio access network 212 may then confirm the resource allocation to the access and mobility management function 250 of the network providers 210, 230. After updating or modifying the N4 interface and the PDU session with registration credentials, the session management function 402 of the other of the network providers 210, 230 may send address information to the user plane function of the other of the network providers 210, 230.

An inter-PLMN (e.g., inter-network provider) network function discovery may be initiated to establish multi-access PDU sessions for a capable PDU session anchor on the user plane function 304 of the network providers 210, 230. In order to back-establish a connection between the user equipment 102 and the user plane function 270 that was not associated with the credentials and provided with authorization credentials from the other of the network providers 210, 230.

The user plane function 304 of the other of the network providers 210, 230 may send a discovery request to the network repository function 632 of the other of the network providers 210, 230 in step 1730. In step 1902, the network repository functions 632, 634 exchange network function information to establish a session across the network providers 210, 230. The retrieved information may be provided to the user plane function 304 from the network repository function 632 in step 1904. In step 1906 a tunnel may be established between the user plane functions 270, 304. The tunnel may be established based on the information from either of the network repository functions 632, 634. The tunnel may be an N9 interface. In step 1908, the user plane function 270 establishes a tunnel with the session management function 402. The tunnel may be an N4 interface. The user plane function 304 may send the context of the user equipment 102 to the user plane function 270 associated with the interworking function 1102 in step 1910. In step 1912, the user plane function 270 establishes a tunnel with the user equipment 102. The tunnel may be established based on the context transferred from user plane function 304.

In step 1914, the user plane function 270 may send a discovery request to the network repository function 634. The network repository function 634 may conduct discovery for the proxy 112 in step 1916. The network repository function 634 may get information related to the proxy 112 (e.g., addresses) based on the network repository function 632. The information may include static routes. The network repository function 634 may include the information. The information received may be sent to the user plane function 270 from the network repository function 634 in step 1918. In step 1920, the user plane function 270 establishes a tunnel with the proxy 112. The tunnel may be established based on the discovery request and the information received from the discovery request. In step 1922, the user plane function 270 may share information related to the proxy 112 with the user plane function 304 of the other of the network providers 210, 230, and in step 1924, the user plane function 304 of the other of the network providers 210, 230 may connect with the proxy 112 based on the information received from the user plane function 270.

Figure 20:
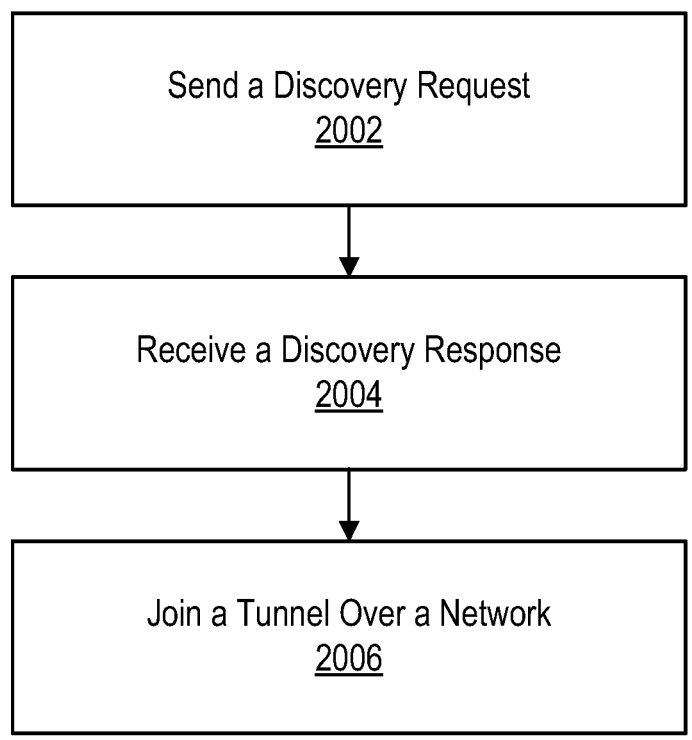
FIG. 20 illustrates an example method of a call flow in accordance with one or more implementations of the present disclosure is shown.

Referring to FIG. 20, an example method 2000 in accordance with one or more implementations of the present disclosure is shown. In step 2002, a discovery request is sent. The discovery request may include the network provider 210, 230 subject to the inquiry. The discovery request may be an HTTP GET request to the URI of the requested instance (e.g., network repository function 634, 632; proxy 112). The discovery request may be sent based on a session request. The session request may be associated with one of the network providers 210, 230.

A discovery response may be received in step 2004. The discovery response may be based on the discovery request. As an example, the network function service consumer may be provided with one or more IP address or fully-qualified domain name (FQDN) of the network function instances. The response may include network function instances that match certain input criteria (e.g., function, availability, location). The discovery response may be based on one of the network providers 210, 230 that is not related to the session request.

In step 2006, a tunnel may be joined. A tunnel may be a point-to-point connection between two entities. For example, a tunnel may be a point-to-point connection between an instance and another instance. A tunnel may be point-to-point connection between two network function functions. A tunnel may be associated with a static route. A tunnel may be encrypted. A tunnel may be based on a Diffie-Helman key exchange. A tunnel may be based on pre-shared keys. A tunnel may be a reference point or interface associated with a 3GPP standard (e.g., N1-N32).

Joining a tunnel may include participating in a handshake. As an example, providing sync and acknowledgment (e.g., syn/ack). Joining a tunnel may include sharing keys through a key exchange to form an encrypted communication path. A tunnel may traverse more than one of the network providers 210, 230.

The discovery request may be performed by a network repository function. The request may be performed for a user plane function (e.g., user plane function 304). In one or more implementations contemplated herein, the tunnel may be between the user plane functions 270, 304.

The discovery request may be performed by a network repository function. The request may be performed for a session management function (e.g., session management function 402). In one or more implementations contemplated herein, the tunnel may be between the session management functions 252, 402. The network repository functions 632, 634 may perform requests for any of the instances or functions associated with network providers 210, 230. The tunnel may be between any of the instances or functions associated with the network providers 210, 230.

Once the tunnel is established, data from the user equipment 102 may be sent over the tunnel. The data may be received over the radio access networks 212, 232 or access points 214, 234. Once the tunnel is established, data from an application server may be received (e.g., application servers 114, 116). The data from user equipment 102 may be based on or part of a multipath connection. The data from one or more of the application server 114, 116 may be based on or part of a multipath connection.

For example, the data from the user equipment 102 may be associated with a data sequence mapping. The data may be associated according to a first subflow sequence number. The data from the application server may be based on the data sequence mapping. The method may further include sending the data from one or more of the application servers 114, 116 to the user equipment 102.

The tunnel may be a point-to-point tunnel between a user plane function of the first network provider and a user plane function of the second network provider. The tunnel may be a point-to-point tunnel between a session management function of the first network provider and a session management function of the second network provider.

Data from the user equipment 102 may be sent to one or more of the user plane functions 270, 304. The data may be sent based on a static route.

Figure 21:
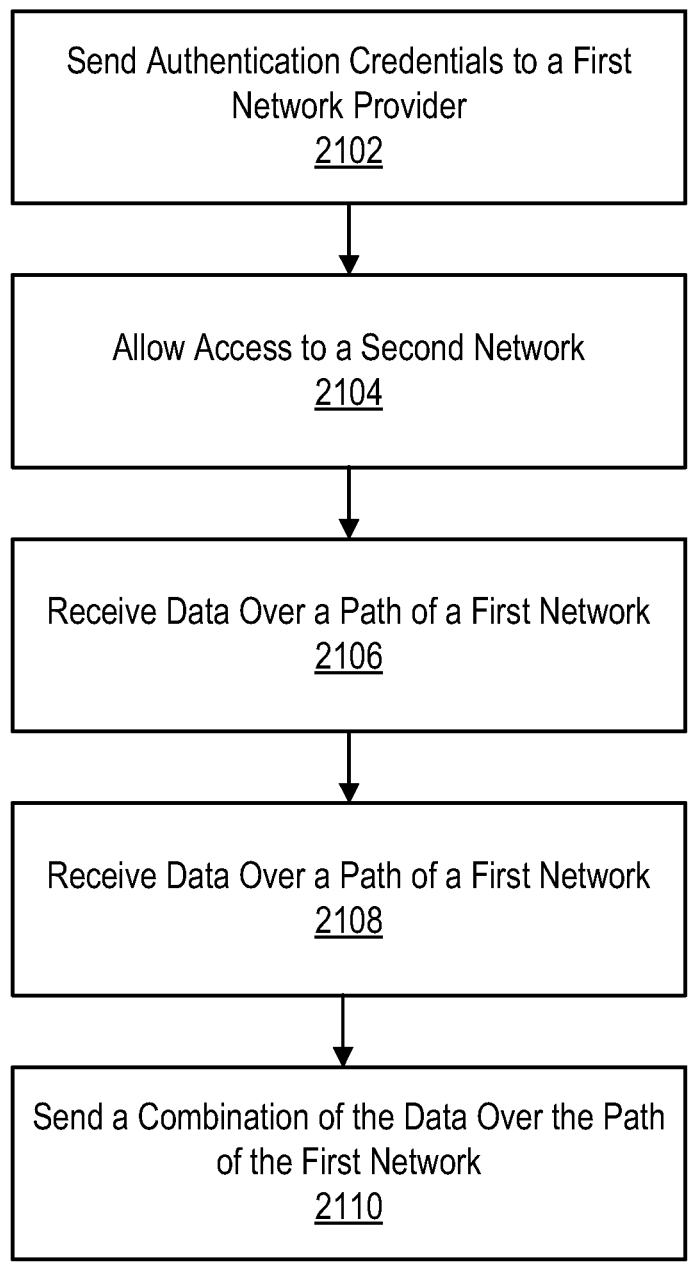
FIG. 21 illustrates an example method of a call flow in accordance with one or more implementations of the present disclosure is shown.

Referring to FIG. 21, an example method 2100 in accordance with one or more implementations of the present disclosure is shown. In step 2102, authentication credentials may be sent. The authentication credentials may be based on a credential circuit. The authentication credentials may be sent based on a registration request from user equipment 102. The user equipment may send the request over an interworking function 1102 (e.g., N3IWF). The request may be over one or more of the network providers 210, 230. In step 2104, access to one or more networks may be provided based on the authentication credentials. The access credentials may include a subscriber identity and its related key. Although the access credentials may be received over one of the network providers (e.g., network provider 210), the access credentials may provide access to the other network provider (e.g., network provider 230).

In step 2106, data may be received over one or more paths of one or more networks of one of the network providers (e.g., network provider 210). The data may be received based on the credential circuit. As an example, the credential circuit may allow access for the data to be sent based on authentication and authorization on the network. In step 2108, data may be received over one or more other paths of one or more networks of one of the other network providers (e.g., network provider 230). In such a way, data over both paths may be received based on a single credential circuit. In step 2110, a combination of the data received over each respective path may be sent to one or more of the application servers 114, 116. The combination may have a single session identifier or be based on the same sequence number. The combination may be based on a data sequence mapping and a subflow sequence number.

A discovery request may also be sent to locate instances and functions associated with the proxy 112 and network providers 210, 230. The discovery request may include the network provider 210, 230 subject to the inquiry. The discovery request may be an HTTP GET request to the URI of the requested instance (e.g., network repository function 634, 632; proxy 112). The discovery request may be sent based on a session request. The session request may be associated with one of the network providers 210, 230.

Based on the discovery request, a discovery response may be received. The discovery response may be based on the discovery request. As an example, the network function service consumer may be provided with one or more IP address or fully-qualified domain name (FQDN) of the network function instances. The response may include network function instances that match certain input criteria (e.g., function, availability, location). The discovery response may be based on one of the network providers 210, 230 that is not related to the session request. Further a tunnel may be joined based on the discovery response. A request to transfer context to the user equipment 102 may be sent or received. The request to transfer context may be based on the discovery response (e.g., sent to the instance identified).

The data over the path of the first network may be associated with a data sequence mapping according to a first subflow sequence number. The data over the path of the second network may be associated with the data sequence mapping according to a second subflow sequence number. The combination may be assembled or concatenated based on the data sequence mapping, the first subflow sequence number, and the second subflow sequence number.

Further, data received from one or more of the application servers 114, 116 may be disassembled or split into portions. The disassembly may be further based on the data sequence mapping or another data sequence mapping. These portions may be sent over the first and second path to the user equipment 102. The combination may be sent to the application server over a path of a third network that is packet-switched. A response from one or more of the application servers 114, 116 may be received from a path of the third network. Information sent to the application servers 114, 116 may be sent over one session to meet application server requirements. As an example, only one user may be allowed to connect to the application server at a time with only one session. In such a way, users are unable to use multiple paths to the application server unless an proxy 112 combines the data into a single session. In some instances, a quantity of sessions may be specified. For example, an application server (e.g., application servers 114, 116) may allow two sessions per user or one session per user. The proxy 112 may use as many sessions as allowed. The proxy 112 may receive an indication of the number of sessions through a GET request with the application server, a preprogrammed list of application servers with indicated sessions, combinations thereof, or otherwise. The network providers 210, 230 may be identified with respective identification numbers.

Figure 22:
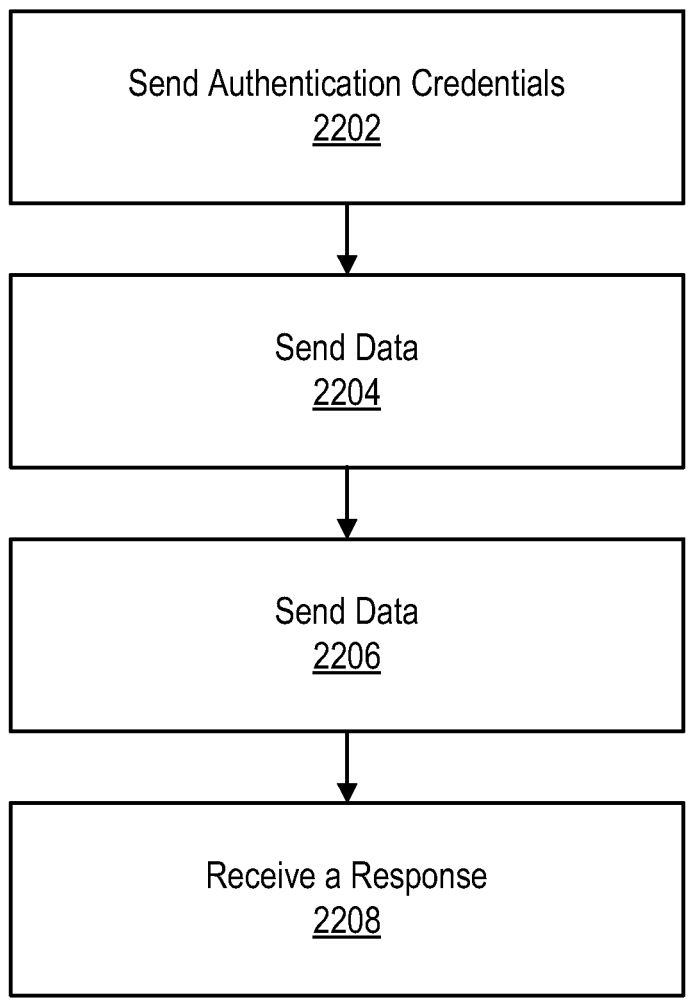
FIG. 22 illustrates an example method of a call flow in accordance with one or more implementations of the present disclosure is shown.

Referring to FIG. 22, an example method of a call flow 2200 in accordance with one or more implementations of the present disclosure is shown. In step 2202, authentication credentials may be sent based on a credential circuit. The credential circuit may be integrated with the user equipment 102 or otherwise accessible to the user equipment 102.

In step 2204, data may be sent over one or more paths of one or more networks of one of the network providers (e.g., network provider 210). The data may be sent based on the credential circuit. As an example, the credential circuit may allow access for the data to be sent based on authentication and authorization on the network. In step 2206, data may be sent over one or more other paths of one or more networks of one of the other network providers (e.g., network provider 230). In such a way, data over both paths may be received based on a single credential circuit.

In step 2208, a response may be received based on the data sent. As an example, the data sent on both paths may be received by an proxy 112 and combined. The combination may be sent on to an application server or application servers 114, 116. The one or more application servers 114, 116 may send the data back to the user equipment 102 over the proxy 112. The response may have portions related to each of the paths. Authorization may be received to access the second network based on the authentication credentials. The data sent over the path of the first network may be associated with a data sequence mapping according to a first subflow sequence number. The data sent over the path of the second network may be associated with the data sequence mapping according to a second subflow sequence number.

As data is prepared to be sent over the paths, the data may be disassembled according to a data sequence mapping and sent over respective network adapters related to the two paths. The disassemble data may be assigned respective sequence numbers for traverse across the paths.

Receiving the responses over the first and second networks may include assembling the responses into executable code or other data. For example, half of the information may be provided over one path from the one or more application servers 114, 116 and the other half may be provided over the other path. After receipt, the halves may be assembled. Assembly may be based on subflow sequence numbers and data sequence mappings. After assembly, the combined data may be executed by a user application. For example, the combined data may represent audio or video data for consumption on user equipment 102. The combined data may be used to provide video content to a user on a display.

All of the network functions described herein are for informational purposes only and are not intended to require the steps recited herein to be performed by those specific network functions. The network functions may be performed collectively through one or more sets of instructions associated with the first network provider 210 or the second network provider 230. The network functions described may be generally referred to as a generic combination function that may run on one or more servers, one or more instances, one or more sets of instructions, and so on. Such instances may be containerized, replicated, scaled, and distributed by network providers 210, 230 to meet the growing demands of respective networks. Any of the steps or functions described in one or more of the methods, architectures, or call flows described herein may be used in conjunction with any of the other methods, architectures, or call flows described herein. Any of the components (e.g., network functions, user equipment, servers) may perform any of the steps from any of the methods or call flows described herein even though not specifically described and may be performed in combination with any of the other components.

It should be appreciated that the techniques described herein relate to various protocols and technology and may at least apply to 3G, LTE, and 5G technologies.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   sending, based on a request from a user device via a first network of a first network provider, authentication credentials to the first network provider, wherein the authentication credentials are based on a credential circuit of the user device;
   allowing, based on a second network provider receiving from the first network provider an indication that access to the first network is authorized for the user device according to the authentication credentials sent to the first network provider, access to a second network of the second network provider;
   receiving, based on the credential circuit, first data over a path of the first network;
   receiving, based on the credential circuit, second data over a path of the second network; and
   sending a combination of the first data and the second data to an application server.

2. The method of claim 1, further comprising:
   receiving, a discovery request of a network repository function; and
   sending, based on the discovery request, a discovery response according to the second network.

3. The method of claim 2, further comprising:
   joining an interface associated with a user plane of the first network provider based on the discovery response.

4. The method of claim 2, further comprising:
   sending, based on the discovery response, a request to transfer context of the user device over an interface associated with a user plane of the first network provider based on the discovery response.

5. The method of claim 1, wherein receiving the first data is associated with a data sequence mapping according to a first subflow sequence number, wherein receiving the second data is associated with the data sequence mapping according to a second subflow sequence number, the method further comprising:
   assembling, based on the data sequence mapping, the first subflow sequence number, and the second subflow sequence number, the combination.

6. The method of claim 1, further comprising:
   receiving, based on the combination, a response; and
   sending the response to the user device, wherein sending the response to the user device comprises:
   disassembling the response into a first portion of the response and a second portion of the response; and
   sending the first portion over the path of the first network and the second portion over the path of the second network.

7. The method of claim 6, wherein sending the combination to the application server comprises sending the combination to the application server over a path of a third network that is packet-switched, wherein receiving the response comprises receiving the response from the path of the third network.

8. The method of claim 7, wherein receiving the response is from the path of the third network.

9. The method of claim 1, wherein the path of the first network comprises a user plane function of the first network, and wherein the path of the second network comprises a user plane function of the second network.

10. The method of claim 1, wherein the first network comprises an interworking function, wherein the request is received via the interworking function.

11. The method of claim 1, wherein the first network comprises a node B, wherein the request is received via the node B.

12. The method of claim 1, wherein the credential circuit comprises an embedded subscriber identity module.

13. The method of claim 1, further comprising:
    sending a subscription package to the user device configured to program the credential circuit.

14. The method of claim 1, wherein sending the combination to the application server comprises sending the combination to the application server over a quantity of sessions based on the application server.

15. The method of claim 1, wherein the first network provider is identified with a first identification number and the second network is identified with a second identification number.

16. A method comprising:
    sending, via a first network of a first network provider, authentication credentials, wherein the authentication credentials are based on a credential circuit of a user device;
    sending, based on the credential circuit, data over a path of the first network to a proxy server;
    sending, based on a second network provider receiving from the first network provider an indication that access to the first network is authorized for the user device according to the authentication credentials sent to the first network provider, data over a path of a second network of the second network provider to the proxy server; and
    receiving, based on communication between the proxy server and an application server and based on a combination of the data sent over the path of the first network and the data sent over the path of the second network, a response over the first network based on the combination and a response over the second network based on the combination.

17. The method of claim 16, further comprising:
receiving access to the second network based on the authentication credentials.

18. The method of claim 16, wherein sending the data over the path of the first network is associated with a data sequence mapping according to a first subflow sequence number, wherein sending the data over the path of the second network is associated with the data sequence mapping according to a second subflow sequence number, the method further comprising:
disassembling, based on the data sequence mapping, the first subflow sequence number, and the second subflow sequence number, the combination.

19. The method of claim 16, wherein receiving the response comprises:
assembling the response over the first network and the response over the second network; and
executing, based on assembling the response over the first network and the response over the second network, a user application associated with the application server.

20. A method comprising:
sending, by a user device, a request via a first network of a first network provider;
sending, to the first network provider, based on a response to the request, authentication credentials based on a credential circuit of the user device;
receiving, based on a second network provider receiving from the first network provider an indication that access to the first network is authorized for the user device according to the authentication credentials sent to the first network provider, access to a second network of the second network provider; and
sending, based on the credential circuit, first data over a path of the first network and second data over a path of the second network, wherein a combination of the first data and the second data is sent to an application server.

21. The method of claim 20, wherein the credential circuit comprises an embedded subscriber identity module.

22. The method of claim 20, wherein sending the first data over the path of the first network is associated with a data sequence mapping according to a first subflow sequence number, wherein sending the second data over the path of the second network is associated with the data sequence mapping according to a second subflow sequence number, wherein the combination is disassembled based on the data sequence mapping, the first subflow sequence number, and the second subflow sequence number.

23. The method of claim 20, further comprising receiving, based on the combination of the first data over the path of the first network and the second data over the path of the second network, a response over the first network and a response over the second network.

24. The method of claim 23, wherein receiving the response over the first network and the response over the second network comprises:
assembling the response over the first network and the response over the second network; and
executing, based on assembling the response over the first network and the response over the second network, a user application associated with the application server.

* * * * *